United States Patent [19]

Murakami et al.

[11] Patent Number: 5,604,494
[45] Date of Patent: Feb. 18, 1997

[54] EFFICIENT ENCODING/DECODING APPARATUS

[75] Inventors: Yoshihiro Murakami; Atsuo Yada; Hiromi Yoshinari; Haruo Togashi; Satoshi Miyazawa; Takuya Kitamura, all of Kanagawa, Japan

[73] Assignee: Sony Corporation, Tokyo, Japan

[21] Appl. No.: 428,255

[22] PCT Filed: Sep. 20, 1994

[86] PCT No.: PCT/JP94/01546

§ 371 Date: May 2, 1995

§ 102(e) Date: May 2, 1995

[87] PCT Pub. No.: WO95/09487

PCT Pub. Date: Apr. 6, 1995

[30] Foreign Application Priority Data

Sep. 28, 1993 [JP] Japan ................. 5-241188

[51] Int. Cl.[6] ................................ H03M 7/00
[52] U.S. Cl. ................................ 341/50; 364/745
[58] Field of Search ............. 341/50; 348/416; 364/745

[56] References Cited

U.S. PATENT DOCUMENTS

| | | | |
|---|---|---|---|
| 5,014,134 | 5/1991 | Lawton et al. | 358/261.3 |
| 5,379,356 | 1/1995 | Purcell et al. | 382/56 |
| 5,481,553 | 1/1996 | Suzuki et al. | 371/49.1 |

FOREIGN PATENT DOCUMENTS

| | | |
|---|---|---|
| 4-85621 | 3/1992 | Japan. |
| 5-167456 | 7/1993 | Japan. |

Primary Examiner—Jeffrey A. Gaffin
Assistant Examiner—Jason L. W. Kost
Attorney, Agent, or Firm—William S. Frommer; Alvin Sinderbrand

[57] ABSTRACT

An efficient encoding/decoding apparatus of this invention comprises orthogonal transform element (10) for orthogonally transforming a digital signal obtained by allowing an analog signal to undergo analog/digital conversion, quantizer (11) for quantizing the digital signal which has undergone orthogonal transform processing, inverse quantizer (21) for inverse-quantizing a digital signal which is not yet caused to undergo inverse orthogonal transform processing, and inverse orthogonal transform element (20) for inverse-orthogonally transforming the orthogonally transformed digital signal, wherein rounding in even number direction or rounding in odd number direction is used in at least one of the orthogonal transform processing and the inverse orthogonal transform processing. Thus, accumulation of rounding errors at the time of, e.g., such a direct digital dubbing to repeatedly encode/decode digital signals such as video signals, etc. is prevented, thus making it possible to reduce picture deterioration of multi-generation characteristic.

5 Claims, 21 Drawing Sheets

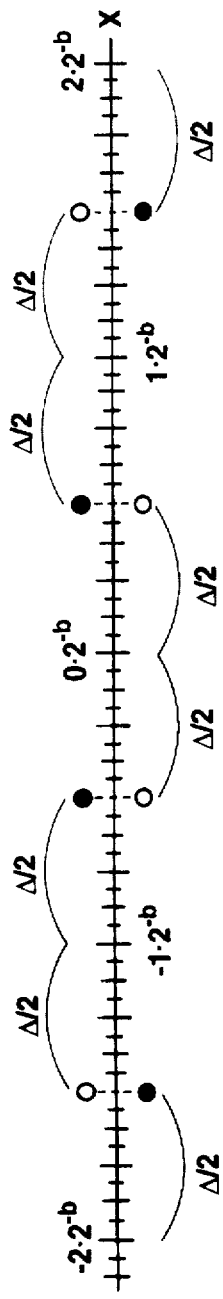
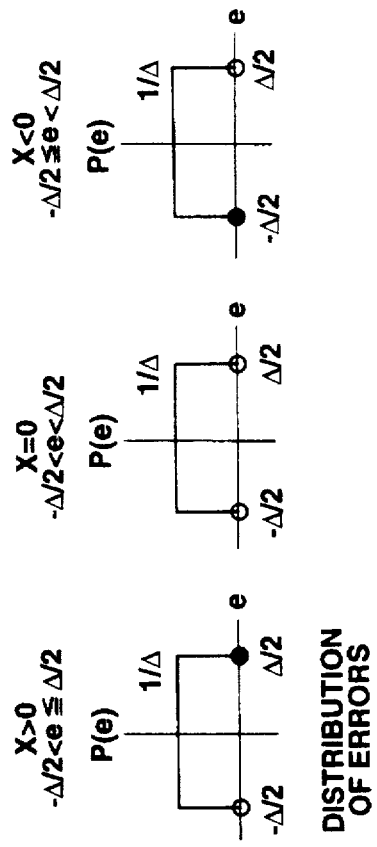
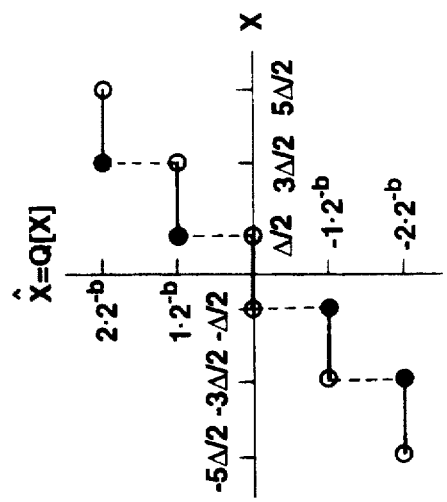
FIG.6A RELATED ART
FIG.6C RELATED ART
FIG.6B RELATED ART

GROUP OF(1)

-1 0-1 0
0 0 0 0
-1 0-1 0
0 0 0 0

-1 0-1 0
0 0 0 0
1 0 1 0
0 0 0 0

-1 0 0 0
0-1 0 0
0 0-1 0
0 0 0-1

1 0 1 0
0 0 0 0
1 0 1 0
0 0 0 0

1 0 1 0
0 0 0 0
-1 0-1 0
0 0 0 0

1 0 0 0
0 1 0 0
0 0 1 0
0 0 0 1

-1 0 0 0
0 0 0-1
0 0 1 0
0 1 0 0

-1 0 0 0
0 0 0 1
0 0 1 0
0-1 0 0

-1 0 0 0
0 1 0 0
0 0-1 0
0 0 0 1

1 0 0 0
0 0 0 1
0 0-1 0
0-1 0 0

1 0 0 0
0 0 0-1
0 0-1 0
0 1 0 0

1 0 0 0
0-1 0 0
0 0 1 0
0 0 0-1

-1 0 1 0
0 0 0 0
-1 0 1 0
0 0 0 0

-1 0 1 0
0 0 0 0
1 0-1 0
0 0 0 0

□ ... SPACE PLANE SAMPLE

... MONOTONOUSLY INCREASING SAMPLE 1 0-1 0
0 0 0 0
1 0-1 0
0 0 0 0

1 0-1 0
0 0 0 0
-1 0 1 0
0 0 0 0

... MONOTONOUSLY DECREASING SAMPLE

GROUP OF(2)

-1 0 -1 0
0 0 0 0
0 0 0 0
0 0 0 0

-1 0 0 0
0 0 0 0
-1 0 0 0
0 0 0 0

-1 0 0 0
0 0 0 0
0 0 -1 0
0 0 0 0

1 0 1 0
0 0 0 0
0 0 0 0
0 0 0 0

1 0 0 0
0 0 0 0
1 0 0 0
0 0 0 0

1 0 0 0
0 0 0 0
0 0 1 0
0 0 0 0

-1 0 1 0
0 0 0 0
0 0 0 0
0 0 0 0

-1 0 0 0
0 0 0 0
1 0 0 0
0 0 0 0

-1 0 0 0
0 0 0 0
0 0 1 0
0 0 0 0

1 0 -1 0
0 0 0 0
0 0 0 0
0 0 0 0

1 0 0 0
0 0 0 0
-1 0 0 0
0 0 0 0

1 0 0 0
0 0 0 0
0 0 -1 0
0 0 0 0

SPACE PLANE SAMPLE

☐ ··· MONOTONOUSLY INCREASING SAMPLE

■ ··· MONOTONOUSLY DECREASING SAMPLE

GROUP OF(3)

| -2 0 0 0 |
| 0 0 0 0 |
| 0 0 0 0 |
| 0 0 0 0 |

DC shift

| 2 0 0 0 |
| 0 0 0 0 |
| 0 0 0 0 |
| 0 0 0 0 |

DC shift

SPACE PLANE SAMPLE

☐ ··· MONOTONOUSLY INCREASING SAMPLE

■ ··· MONOTONOUSLY DECREASING SAMPLE

GROUP OF(4)

```
-2 0-1 0
 0-1 0 0
 1 0 0 0
 0 0 0-1
```

```
-2 0-1 0
 0 1 0 0
 1 0 0 0
 0 0 0 1
```

```
-2 0 1 0
 0-1 0 0
-1 0 0 0
 0 0 0-1
```

```
 2 0-1 0
 0-1 0 0
 1 0 0 0
 0 0 0-1
```

```
 2 0-1 0
 0 1 0 0
 1 0 0 0
 0 0 0 1
```

```
 2 0 1 0
 0-1 0 0
-1 0 0 0
 0 0 0-1
```

```
-2 0 1 0
 0 1 0 0
-1 0 0 0
 0 0 0 1
```

```
-2 0 1 0
 0 0 0-1
 1 0 0 0
 0 1 0 0
```

```
-2 0 1 0
 0 0 0 1
 1 0 0 0
 0-1 0 0
```

```
 2 0 1 0
 0 1 0 0
-1 0 0 0
 0 0 0 1
```

```
 2 0-1 0
 0 0 0 1
-1 0 0 0
 0-1 0 0
```

```
 2 0-1 0
 0 0 0-1
-1 0 0 0
 0 1 0 0
```

```
-2 0-1 0
 0 0 0 1
-1 0 0 0
 0-1 0 0
```

```
-2 0-1 0
 0 0 0-1
-1 0 0 0
 0 1 0 0
```

```
-2 0 0 0
 0 1 0-1
 0 0 0 0
 0 1 0 1
```

```
 2 0 1 0
 0 0 0-1
 1 0 0 0
 0 1 0 0
```

```
 2 0 1 0
 0 0 0 1
 1 0 0 0
 0-1 0 0
```

```
 2 0 0 0
 0 1 0-1
 0 0 0 0
 0 1 0 1
```

```
-2 0 0 0
 0 1 0 1
 0 0 0 0
 0-1 0 1
```

```
-2 0 0 0
 0-1 0-1
 0 0 0 0
 0 1 0-1
```

```
 2 0 0 0
 0-1 0-1
 0 0 0 0
 0 1 0-1
```

```
 2 0 0 0
 0 1 0 1
 0 0 0 0
 0-1 0 1
```

□ ··· SPACE PLANE SAMPLE

▨ ··· MONOTONOUSLY INCREASING SAMPLE

■ ··· MONOTONOUSLY DECREASING SAMPLE

EFFICIENT ENCODING/DECODING APPARATUS

TECHNICAL FIELD

This invention relates to an efficient encoding/decoding apparatus, and more particularly to such an efficient encoding/decoding apparatus capable of suppressing accumulation (storage) of errors in repeatedly encoding/decoding digital signals, e.g., video signals, etc.

BACKGROUND ART

In recent years, as an efficient encoding/decoding apparatus adapted for compression-encoding a digital signal thereafter to decode such encoded signal, there have appeared such digital VTRs adapted to compression-encode, e.g., a digital video signal to record such encoded signal onto a recording medium to decode a signal reproduced from the recording medium.

In the above-mentioned VTRs, a procedure as described below is generally employed to compress a video signal to record the compressed signal to further reproduce the recorded signal to expand it.

Namely, although not shown, digital video data on the time axis delivered to signal recording system (encoding side) is first caused to undergo orthogonal transform processing, e.g., Discrete Cosine Transform (DCT), etc. so that such data is transformed into data on the frequency axis. The video data on the frequency axis is quantized and is further caused to undergo, e.g., variable length encoding, etc. so that such data is compressed. The compressed video data is recorded onto a magnetic tape as a recording medium.

Moreover, at signal reproducing system (decoding side), the compressed video data recorded on the recording medium is reproduced. This reproduced data is expanded by variable length decoding, and is further caused to undergo inverse quantization. The inversely quantized data is caused to undergo Inverse Discrete Cosine Transform (IDCT) as inverse orthogonal transform so that the video data on the frequency axis is restored into video data on the time axis for a second time. Thereafter, such restored video data will be taken out.

As digital VTR for carrying out compression-encoding of such video signal, there are, e.g., digital VTRs using, e.g., predictive encoding system between frames/between fields. In such digital VTR, it is necessary to allow local decode picture for carrying out the predictive encoding at the encoding side and decode picture of the decoding side to be in correspondence with each other. At this time, there is the problem that if operation methods at inverse transform (inverse orthogonal transform) in local decoding at the encoding side and inverse transform (inverse orthogonal transform) at the decoding side and rounding methods at the encoding side and the decoding side are different, miss match which will be described later may take place. For this reason, in the recommendation H.261 (Television conference/telephone low speed moving picture encoding algorithm) in Comite Consultatif Internationale Telegraphique et Telephonique (CCITT), quantization representative values are caused to be odd number as shown in Table 1.

TABLE 1

| QUANTIZATION REPRESENTATIVE VALUE OF QUANTIZATION WITH DEAD ZONE | | | | | | | | | | | |
|---|---|---|---|---|---|---|---|---|---|---|---|
| QUANT \ QUANTIZATION INDEX | 1 | 2 | 3 | 4 | . 8 | 9 | . 17 | 18 | . 30 | 31 |
| −127 | −255 | −509 | −765 | −1019 | . −2039 | −2048 | . −2048 | −2048 | . −2048 | −2048 |
| −126 | −253 | −505 | −759 | −1011 | . −2023 | −2048 | . −2048 | −2048 | . −2048 | −2048 |
| . | . | . | . | . | . | . | . | . | . | . |
| −2 | −5 | −9 | −15 | −19 | . −39 | −45 | . −85 | −89 | . −149 | −155 |
| −1 | −3 | −5 | −9 | −11 | . −23 | −27 | . −51 | −53 | . −89 | −93 |
| 0 | 0 | 0 | 0 | 0 | . 0 | 0 | . 0 | 0 | . 0 | 0 |
| 1 | 3 | 5 | 9 | 11 | . 23 | 27 | . 51 | 53 | . 89 | 93 |
| 2 | 5 | 9 | 15 | 19 | . 39 | 45 | . 85 | 89 | . 149 | 155 |
| 3 | 7 | 13 | 21 | 27 | . 55 | 63 | . 119 | 125 | . 209 | 217 |
| 4 | 9 | 17 | 27 | 35 | . 71 | 81 | . 153 | 161 | . 269 | 279 |
| 5 | 11 | 21 | 33 | 43 | . 87 | 99 | . 187 | 197 | . 329 | 341 |
| . | . | . | . | . | . | . | . | . | . | . |
| 56 | 113 | 225 | 339 | 451 | . 903 | 1017 | . 1921 | 2033 | . 2047 | 2047 |
| 57 | 115 | 229 | 345 | 459 | . 919 | 1035 | . 1955 | 2047 | . 2047 | 2047 |
| 58 | 117 | 233 | 351 | 467 | . 935 | 1053 | . 1989 | 2047 | . 2047 | 2047 |
| 59 | 119 | 237 | 357 | 475 | . 951 | 1071 | . 2023 | 2047 | . 2047 | 2047 |
| 60 | 121 | 241 | 363 | 483 | . 967 | 1089 | . 2047 | 2047 | . 2047 | 2047 |
| . | . | . | . | . | . | . | . | . | . | . |
| 125 | 251 | 501 | 753 | 1003 | . 2007 | 2047 | . 2047 | 2047 | . 2047 | 2047 |
| 126 | 253 | 505 | 759 | 1011 | . 2023 | 2047 | . 2047 | 2047 | . 2047 | 2047 |
| 127 | 255 | 509 | 765 | 1019 | . 2039 | 2047 | . 2047 | 2047 | . 2047 | 2047 |

Namely, as shown in the Table 1 mentioned above, in the above-mentioned recommendation H.261, quantization representative values are odd number except for −2048. Employment of odd number as the quantization representative value is to solve the problem that even if the IDCT standard is satisfied, miss match may take place between IDCT of different designs. In the Table 1, quantization representative values are symmetrical in positive and negative directions except for +2047/−2048. In addition, step size is equal to 2×QUANT.

Meanwhile, while the above-mentioned miss match is caused by the fact that operation methods and/or rounding methods in inverse transform processing are different, even in the case where operation methods and/or rounding methods in the inverse transform processing are not different, similar problem may take place.

For example, in digital VTRs, the problem of picture degradation (deterioration) in multi-generation characteristic at the time of direct digital dubbing may take place as the above-mentioned miss match.

Namely, there is the problem that pattern emphasis by monotonous increase or decrease of amplitude level of a certain specific picture pattern takes place.

The reason why picture degradation takes place in the multi-generation characteristic at the time of direct digital dubbing in the digital VTR will now be described with reference to the attached drawings.

The configuration employed in the case where the above-mentioned direct digital dubbing is carried out in the digital VTR is shown in FIG. 1.

In this FIG. 1, an input video signal delivered through terminal 103 is recorded on magnetic tape in digital VTR 100. Output terminal of the digital VTR 100 and input terminal of digital VTR 101 are connected, and output terminal of digital VTR 101 and input terminal of digital VTR100 are connected. In respective digital VTRs 100, 101, recording/reproduction is repeated, whereby multi-dubbing is carried out. In this example, output terminal of digital VTR 106 is connected also to monitor 102. Accordingly, it is possible to observe change of picture quality by multi-dubbing by means of the monitor 102.

Moreover, the respective digital VTRs 100, 101 of FIG. 1 are digital VTR of component recording in which bit rate reduction is employed. It is now assumed that, as the system of bit rate reduction, transform encoding+variable length encoding is employed and the DCT mentioned above is employed as transform basic (basis) function. Further, it is assumed that these respective digital VTRs 100, 101 are adapted to support system of 10 bit video, and operation accuracy of transform-inverse transform (DCT-IDCT) is thus adjusted under the condition where operation word length is taken (ensured) so as to sufficiently satisfy such video accuracy.

Simplified configuration for carrying out direct digital dubbing shown in FIG. 1 can be as shown in FIG. 2.

Namely, in FIG. 2, terminal 103 is supplied with data from one digital VTR as input data, and this input data is caused to undergo DCT by DCT Circuit 111. Coefficient data from the DCT circuit 111 is quantized by re-quantizer (quantization/inverse quantization element) 112, and its output is sent to IDCT circuit 113. Rounding error Erc takes place in output from the re-quantizer 112. Moreover, rounding error Ers takes place also in output from the IDCT circuit 113 and output of the IDCT circuit 113 is sent to the DCT circuit 111. in this example, rounding in infinity direction which will be described later is employed for this rounding. Output of IDCT circuit 113 is sent to monitor, etc. from terminal 104.

Moreover, when multi-dubbing in FIG. 2 is expressed by further different representation, such multi-dubbing can be indicated as shown in FIG. 3. In FIG. 3, the case where, e.g., two times of dubbing operations (i.e., the case where three times of transform-inverse transform operations are carried out) is shown. The two times of dubbing operations correspond to the fact that three sets of configurations each comprised of DCT circuit 111, quantizer/inverse quantizer 112, and IDCT circuit 113 are connected in series.

When the relationship between word length of input/output and the significant digit is expressed in a conceptual manner in the configuration of FIG. 2, such relationship can be expressed as shown in FIG. 4.

In FIG. 4, coefficients (AC coefficients) except for DC coefficient are uniformly quantized. Here, quantization step of DC coefficient is assumed to be qdc and quantization step of AC coefficient is assumed to be qac. Moreover, normalized DCT, IDCT are used. At this time, the relationship between bits of coefficient plane and re-quantization step is expressed below:

qxx=divisor quantization level=qxx.Q[coefficient/qxx]

In the above expression, Q[ ] indicates rounding. Accordingly, for example, qdc=qac=1 . . . rounding into coefficient plane 12 bits
qdc=qac=2 . . . rounding into coefficient plane 11 bits
qdc=qac=4 . . . rounding into coefficient plane 10 bits In digital VTR as described above, when it is assumed that there is no problem because sufficient accuracy is ensured in operation of DCT-IDCT, it is considered that generation of picture degradation (monotonous increase or decrease of specific picture pattern) at the time of direct digital dubbing results from the fact that rounding errors are accumulated.

Here, as the rounding system, there are, e.g., simple rounding (rounding in positive direction) or rounding in infinity direction, etc. Differences between these rounding systems will now be described below.

Rounding in positive direction (simple rounding) will be first described with reference to FIG. 5.

In FIG. 5, mark 0 in the figure indicates that value marked in this way is not included and mark ● indicates that value marked in this way is included. Namely, in A and B of FIG. 5, when value is more than $-\Delta/2$ and is less than $\Delta/2$, value within that range is rounded into 0; when value is more than $\Delta/2$ and is less than $3\Delta/2$, value within that range is rounded into $1 \cdot 2^{-b}$; when value is more than $3\Delta/2$ and is less than $5\Delta/2$, value within that range is rounded into $2 \cdot 2^{-b}$; when value is more than $-3\Delta/2$ and is less than $-\Delta/2$, value within that range is rounded into $-1 \cdot 2^{-b}$; and when value is more than $-5\Delta/2$ and is less than $-8\Delta/2$, value within that range is rounded into $-2 \cdot 2^{-b}$. In addition P( ) of C indicates probability.

In the rounding in positive direction (simple rounding), since judgment is carried out only by bits to carry out rounding, boundary point is always rounded up. Accordingly, as designated at C of FIG. 5, error value always includes $\Delta/2$. As a result, distribution of errors deviates. It should be noted that the boundary point is the just half of bit subject to rounding, i.e., ±0.5, and is point where asymmetry appears in the distribution of errors.

From facts as described above, rounding in infinity direction is conventionally used.

The rounding in infinity direction will now be described with reference to FIG. 8.

Also in this FIG. 8, mark 0 in the figure indicates that value marked in this way is not included and mark ● indicates that value marked in this way is included. Namely, in A and B of FIG. 6, when value is greater than $-\Delta/2$ and is less than $\Delta/2$, value within that range is rounded into 0; when value is more than $\Delta/2$ and is less than $3\Delta/2$, value within that range is rounded into $1 \cdot 2^{-b}$; when value is more than $3\Delta/2$ and is less than $5\Delta/2$, value within that range is rounded into $2 \cdot 2^{-b}$; when value is more than $-3\Delta/2$ and is less than $-\Delta/2$, value within that range is rounded into $-1 \cdot 2^{-b}$; and when value is more than $-5\Delta/2$ and is less than $-3\Delta/2$, value within that range is rounded into $-2 \cdot 2^{-b}$. In addition, P( ) of C of FIG. 8 also indicates probability.

In this rounding in infinity direction, boundary point is rounded up so that positive and negative values are the same in terms of absolute value. Accordingly, there result three kinds of distributions of errors as indicated by (a)~(c) of C of FIG. 6, and these distributions of errors are balanced with X=0 being as center.

As stated above, in rounding, it is seen that only point of Δ/2 is point which allows the range of error to be out of balance.

Explanation will now be given in more practical sense.

Here, data of pixels of 2×2 on the time axis is assumed to be expressed below:

```
        D00  D01
        D10  D11,
``` and data of pixels of 2×2 on the frequency axis is assumed to be expressed below:

```
        C00  C01
        C10  C11
```

Moreover, in order to reduce portions subject to rounding operation, DCT of pixel data of 2×2 and IDCT of pixel data of 2×2 corresponding thereto are expressed as follows:

```
DCT

C00 = D00 + D01 + D10 + D11
C01 = D00 − D01 + D10 − D11
C10 = D00 + D01 − D10 − D11
C11 = D00 − D01 − D10 + D11
IDCT

D00 = (C00 + C01 + C10 + C11)/4
D01 = (C00 − C01 + C10 − C11)/4
D10 = (C00 + C01 − C10 − C11)/4
D11 = (C00 − C01 − C10 + C11)/4
```

Here, change of data in the case where two times of dubbing operations, i.e., three times of encoding/decoding processing are implemented is as follows. As the rounding method at this time, rounding in infinity direction is used and step size of quantization is assumed to be 2.

Change of data in the case where, e.g., {3, 1, 1, 0} is given to input is as follows.

| Input | D = {3, 1, 1, 0} |
|---|---|
| First encoding/decoding | |
| After DCT | C = {5, 3, 3, 1} |
| After quantization/inverse quantization | C = {6, 4, 4, 2} |
| After IDCT before rounding | D = {4.0, 1.0, 1.0, 0.0} |
| After IDCT after rounding | D = {4, 1, 1, 0} |
| Second encoding/decoding (First dubbing) | |
| After DCT | C = {6, 4, 4, 2} |
| After quantization/inverse quantization | C = {6, 4, 4, 2} |
| After IDCT before rounding | D = {4.0, 1.0, 1.0, 0.0} |
| After IDCT after rounding | D = {4, 1, 1, 0} |
| Third encoding/decoding (Second dubbing) | |
| After DCT | C = {6, 4, 4, 2} |
| After quantization/inverse quantization | C = {6, 4, 4, 2} |
| After IDCT before rounding | D = {4.0, 1.0, 1.0, 0.0} |
| After IDCT after rounding | D = {4, 1, 1, 0} |

At the second operation and operations subsequent thereto, even if encoding/decoding (i.e., dubbing) operations are implemented many times, there is no change in data.

Change of data in the case where, e.g., {1, 1, 1, 0} is given to input is as follows:

| Input | D = {1, 1, 1, 0} |
|---|---|
| First encoding/decoding | |
| After DCT | C = {3, 1, 1, −1} |
| After quantization/inverse quantization | C = {4, 2, 2, −2} |
| After IDCT before rounding | D = {1.5, 1.5, 1.5, −0.5} |
| After IDCT after rounding | D = {2, 2, 2, −1} |
| Second encoding/decoding (First dubbing) | |
| After DCT | C = {5, 3, 3, −3} |
| After quantization/inverse quantization | C = {6, 4, 4, −4} |
| After IDCT before rounding | D = {2.5, 2.5, 2.5, −1.5} |
| After IDCT after rounding | D = {3, 3, 3, −2} |
| Third encoding/decoding (Second dubbing) | |
| After DCT | C = {7, 5, 5, −5} |
| After quantization/inverse quantization | C = {8, 6, 6, −6} |
| After IDCT before rounding | D = {3.5, 3.5, 3.5, −2.5} |
| After IDCT after rounding | D = {4, 4, 4, −3} |

By implementation of the second encoding/decoding (i.e., dubbing) operations and operations subsequent thereto, data would change in divergence direction. In other words, rounding errors are accumulated.

As stated above, there are instances where when rounding in infinity direction is used as a method of operation rounding in quantization and inverse quantization, data changes and diverges every time of dubbing with respect to a certain input, i.e., rounding errors are accumulated.

In view of facts as described above, an object of this invention is to provide an efficient encoding/decoding apparatus which permits picture deterioration to be extremely less in multi-generation characteristic at the time of, e.g., direct digital dubbing.

DISCLOSURE OF THE INVENTION

An efficient encoding/decoding apparatus according to this invention has been proposed in order to attain the above-described object, and includes orthogonal transform means for orthogonally transforming a digital signal obtained by allowing an analog signal to undergo analog/digital conversion, and inverse orthogonal transform means for inverse-orthogonally transforming the orthogonally transformed digital signal, wherein rounding in even number direction or rounding in odd number direction is used in at least one of the orthogonal transform processing and the inverse orthogonal transform processing.

The efficient encoding/decoding apparatus of this invention is further provided with quantizing means for quantizing the digital signal which has undergone the orthogonal transform processing, and inverse quantizing means for inverse-quantizing a digital signal which is not yet caused to undergo the inverse orthogonal transform processing.

In accordance with this invention, rounding in even number direction or rounding in odd number direction is used in at least one of orthogonal transform processing and inverse orthogonal transform processing to balance the range of rounding error irrespective of polarity on space plane to prevent accumulation of rounding errors in multi-generation characteristic at the time of, e.g., direct digital dubbing, thus permitting picture deterioration to be extremely less.

BRIEF DESCRIPTION OF THE DRAWINGS

FIGS. 6A–6C are a view for explaining rounding in infinity direction.

BEST MODE FOR CARRYING OUT THE INVENTION

Preferred embodiment of this invention will now be described with reference to the attached drawings.

Figure 7:
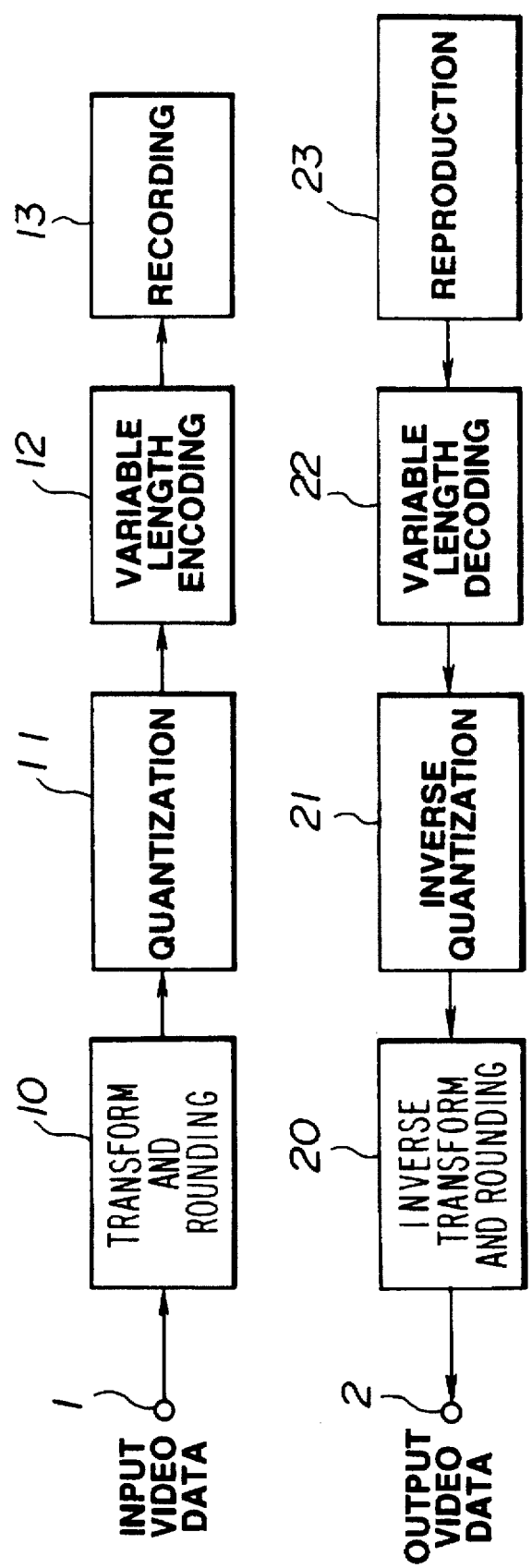
FIG. 7 is a block circuit diagram showing outline of the configuration of an efficient encoding/decoding apparatus of an embodiment of this invention.

An efficient encoding/decoding apparatus of the embodiment of this invention includes, as shown in FIG. 7, orthogonal transform element 10 for orthogonally transforming a digital signal obtained by allowing an analog signal to undergo analog/digital conversion, and inverse orthogonal transform element 20 for inverse-orthogonally transforming the orthogonally transformed digital signal, wherein rounding in even number direction or rounding in odd number direction is used in at least one of the orthogonal transform processing and the inverse orthogonal transform processing.

Moreover, the efficient encoding/decoding apparatus of this invention is further provided quantizer 11 for quantizing the digital signal which has undergone the orthogonal transform processing, and inverse quantizer 21 for inverse-quantizing a digital signal which is not yet caused to undergo the inverse orthogonal transform processing.

In FIG. 7, a digital signal obtained by an allowing analog signal to undergo analog/digital conversion is delivered to terminal 1, and this digital signal is sent to orthogonal transform element 10 for carrying out, e.g., Discrete Cosine Transform (DCT) processing, etc. Digital signal orthogonally transformed from the time axis to the frequency axis at the orthogonal transform element 10 is quantized at quantizer 11, and is further compressed as the result of the fact that it is caused to undergo variable length encoding by variable length encoder 12. This compressed digital data is recorded onto a recording medium by recording means 13.

Moreover, the compressed digital data recorded on the recording medium is reproduced by reproducing means 23. This reproduced data is expanded by variable length decoder 22, and is further caused to undergo inverse quantization by inverse quantizer 21. The inverse-quantized data is caused to undergo inverse orthogonal transform (e.g., Inverse Discrete Cosine Transform (IDCT)) by inverse orthogonal transform element 20 so that the signal on the frequency axis is restored into digital signal on the time base for a second time. Thereafter, the digital signal thus restored is taken out from terminal 2.

While there are instances where the problem of picture deterioration may take place as previously described in multi-generation characteristic at the time of, e.g., direct digital dubbing in such digital VTR, this invention employs a scheme such that, in order to reduce such picture deterioration, rounding in even number direction or rounding in odd number direction is used in at least one of the orthogonal transform processing, e.g., DCT and the inverse orthogonal transform processing, e.g., IDCT.

It should be noted that the above-mentioned rounding in even number direction carries out round-off or round-up so that rounded result of the boundary point necessarily becomes even number value.

Namely, in FIG. 8, mark O in the figure indicates that the value marked in such way is not included, and mark ● indicates that the value marked in such way is included. In FIGS. 8A and 8B when value is more than $-\Delta/2$ and is less than $\Delta/2$, value within that range is round into 0; when value is more than $\Delta/2$ and is less than $3\Delta/2$, value within that range is rounded into $1 \cdot 2^{-b}$; when value is more than $3\Delta/2$ and is less than $5\Delta/2$, value within that range is rounded into $2 \cdot 2^{-b}$; when value is more than $-3\Delta/2$ and is less than $-\Delta/2$, value within that range is rounded into $-1 \cdot 2^{-b}$; and when value is more than $-5\Delta/2$ and is less than $-3\Delta/2$, value within that range is rounded into $-2 \cdot 2^{-b}$. In addition, P( ) of FIG. 8C indicates probability.

Figure 8A:
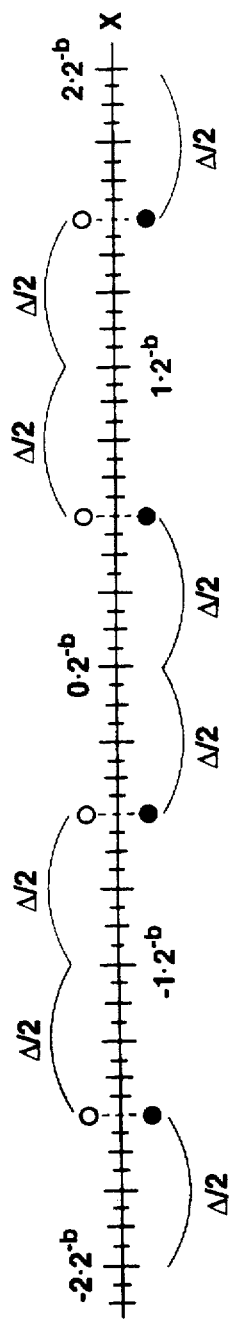
FIGS. 8A–8D are a view for explaining rounding in even number direction and odd number direction.
Figure 8B:
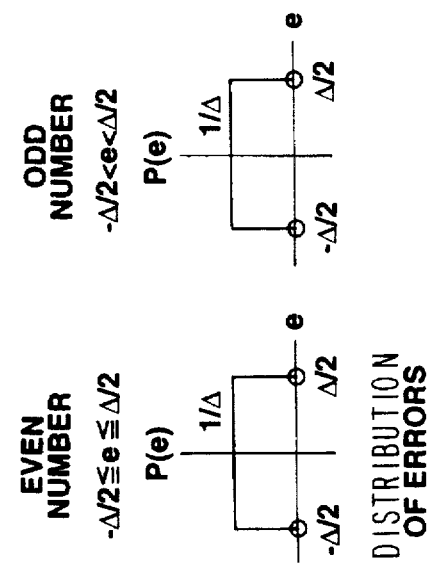
Figure 8C:
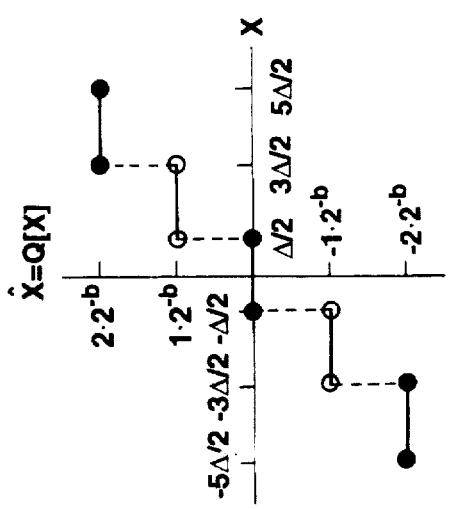

In this rounding in even number direction, round-off or round-up is carried out so that rounded result of boundary point necessarily becomes even number value. Accordingly, there are two kinds of distributions of errors as indicated by FIG. 8C and distribution of errors is "balanced with respective numeric values being as center".

Explanation will now be given in more detail.

Here, similarly to the previously described prior art, data of pixels of 2×2 on the time axis is expressed below:

| | |
|---|---|
| D00 | D01 |
| D10 | D11 | and data of pixels of 2×2 on the frequency axis is expressed below:

| | |
|---|---|
| C00 | C01 |
| C10 | C11 |

Moreover, DCT of pixel data of 2×2 and IDCT of 2×2 corresponding thereto are expressed as follows:

DCT

C00 = D00 + D01 + D10 + D11
C01 = D00 − D01 + D10 − D11
C10 = D00 + D01 − D10 − D11
C11 = D00 − D01 − D10 + D11

IDCT

D00 = (C00 + C01 + C10 + C11)/4
D01 = (C00 − C01 + C10 − C11)/4
D10 = (C00 + C01 − C10 − C11)/4
D11 = (C00 − C01 − C10 + C11)/4

Here, for quantization step size, as value except for power of 2, e.g., 3 is used, and two times of dubbing operations, i.e., three times of encoding/decoding processing are implemented to input. Change of data in this case is as follows.

Explanation will now be given in connection with the case where, e.g., {1, 1, 1, 0} in which rounding errors are accumulated in rounding in infinity direction of the previously described prior art is given to input.

| Input | D = {1, 1, 1, 0} |
|---|---|
| First encoding/decoding | |
| After DCT | C = {3, 1, 1, −1} |
| After quantization/inverse quantization | C = {3, 0, 0, 0} |
| After IDCT before rounding | D = {0.75, 0.75, 0.75, 0.75} |
| After IDCT after rounding | D = {1, 1, 1, 1} |
| Second encoding/decoding (first dubbing) | |
| After DCT | C = {4, 0, 0, 0} |
| After quantization/inverse quantization | C = {3, 0, 0, 0} |
| After IDCT before rounding | D = {0.75, 0.75, 0.75, 0.75} |
| After IDCT after rounding | D = {1, 1, 1, 1} |
| Third encoding/decoding (second dubbing) | |
| After DCT | C = {4, 0, 0, 0} |
| After quantization/inverse quantization | C = {3, 0, 0, 0} |
| After IDCT before rounding | D = {0.75, 0.75, 0.75, 0.75} |
| After IDCT after rounding | D = {1, 1, 1, 1} |

In a manner as stated above, even if continuous connections are made many times at the second operation and operations subsequent thereto, data does not change.

Moreover, as the example using rounding in even number direction as rounding, explanation will now be given in connection with the example where rounding in even number direction is used for, e.g., rounding after IDCT.

| Input | D = {1, 1, 1, 0} |
|---|---|
| First encoding/decoding | |
| After DCT | C = {3, 1, 1, −1} |
| After quantization/inverse quantization | C = {4, 2, 2, −2} |
| After IDCT before rounding | D = {1.5, 1.5, 1.5, 0.5} |
| After IDCT after rounding | D = {2, 2, 2, 0} |
| Second encoding/decoding (first dubbing) | |
| After DCT | C = {6, 2, 2, −2} |
| After quantization/inverse quantization | C = {6, 2, 2, −2} |
| After IDCT before rounding | D = {2.0, 2.0, 2.0, 0.0} |
| After IDCT after rounding | D = {2, 2, 2, 0} |
| Third encoding/decoding (second dubbing) | |
| After DCT | C = {6, 2, 2, −2} |
| After quantization/inverse quantization | C = {6, 2, 2, −2} |
| After IDCT before rounding | D = {2.0, 2.0, 2.0, 0.0} |
| After IDCT after rounding | D = {2, 2, 2, 0} |

In a manner as stated above, even if continuous connections are carried out many times at the second operation and operations subsequent thereto, data does not change.

Meanwhile, the reason why rounding in even number direction (or rounding in odd number direction) is used in at least one of the orthogonal transform (Discrete Cosine Transform (DCT)) and the inverse orthogonal transform (IDCT) as described above in the embodiment of this invention will now be described in detail.

Figure 8D:
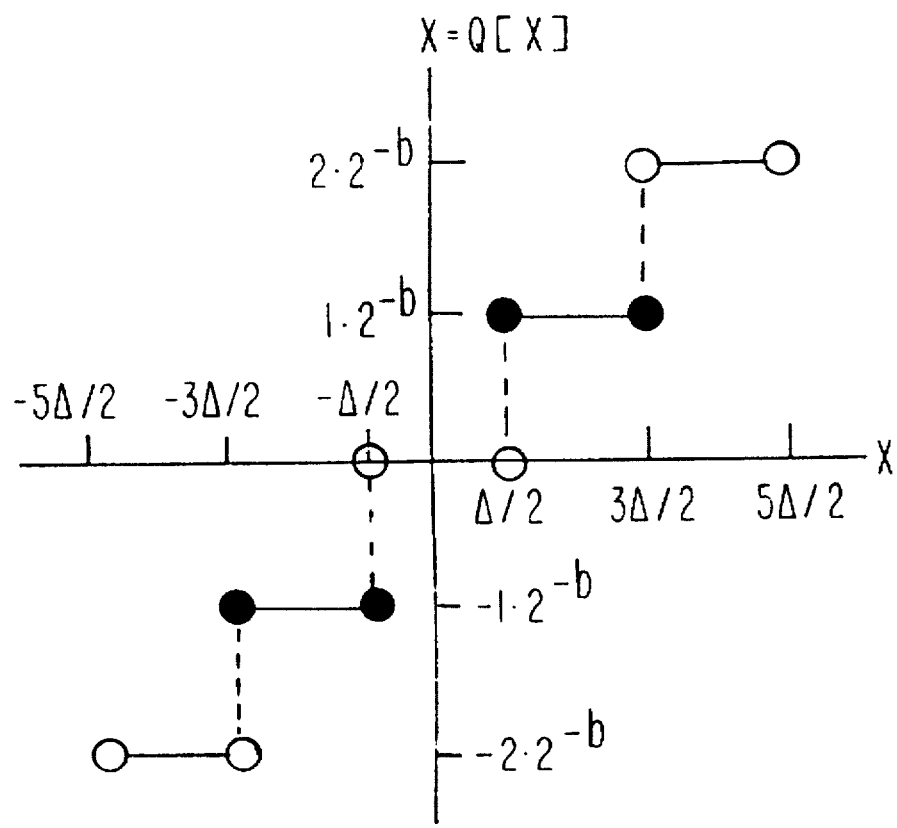
Figure 9:
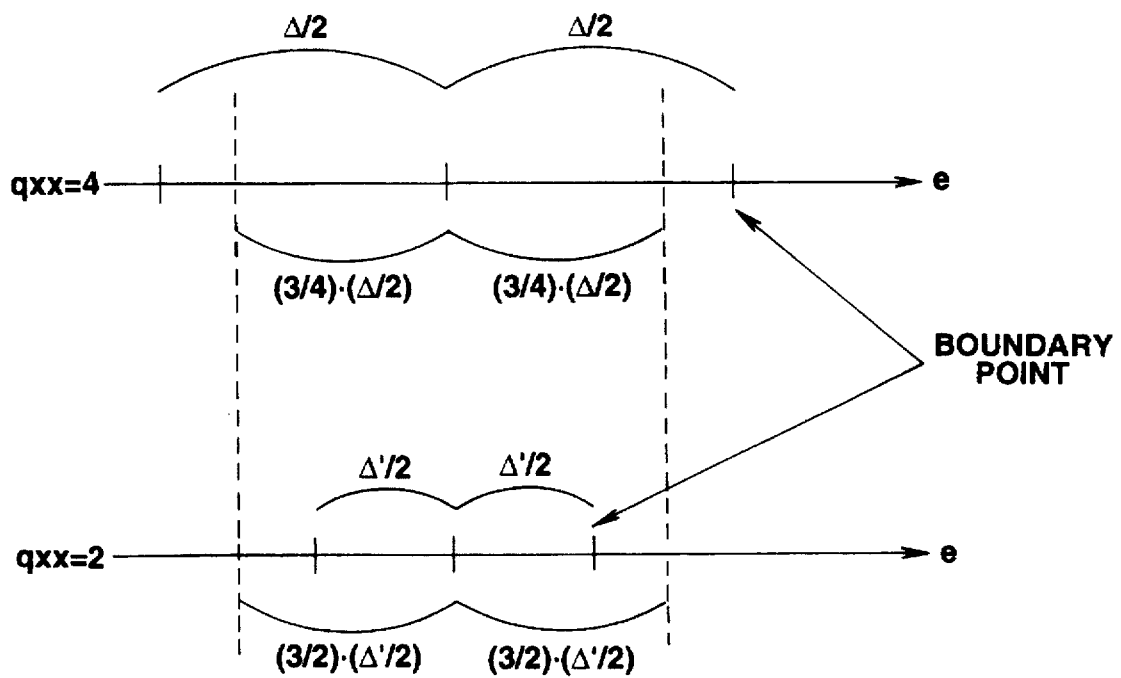
FIG. 9 is a view showing the range of error when quantization step size is set to 3.

Initially, explanation will be given in connection with the reason why rounding in even number direction or rounding in odd number direction is used without use of rounding in infinity direction as in the previously described prior art. It is to be noted that while rounding in even number direction is mainly described, rounding in odd number direction is also fundamentally the same as the rounding in even number direction, and is shown in FIG. 8D.

Explanation will now be given by using real picture in connection with the mechanism of accumulation cycle in which rounding errors are accumulated (accumulation of errors by rounding in infinity direction) by repeating direct digital dubbing.

An actual example 1 in which rounding errors are accumulated by rounding in infinity direction will be described. In this actual example 1, quantization step of DC coefficient is assumed to be qdc=4, and quantization step of AC coefficient is assumed to be qac=2. This is the example where entire picture samples monotonously increase.

Here, input is assumed to be expressed as follows:

| 310 | 303 | 303 | 310 |
|---|---|---|---|
| 310 | 303 | 303 | 310 |
| 310 | 303 | 303 | 310 |
| 310 | 303 | 303 | 310 |

(1-1)

DCT output obtained by allowing this input to undergo Discrete Cosine Transform (DCT) is expressed as follows:

| DC | AC1 | AC2 | AC3 | | 1226 | 0 | 14 | 0 |
|---|---|---|---|---|---|---|---|---|
| AC4 | AC5 | AC6 | AC7 | = | 0 | 0 | 0 | 0 |
| AC8 | AC9 | AC10 | AC11 | | 0 | 0 | 0 | 0 |
| AC12 | AC13 | AC14 | AC15 | | 0 | 0 | 0 | 0 |

Thus, DC coefficient of this DCT output becomes equal to 1226. When this DC coefficient is divided by 4 (re-quantization), 306.5 results. Moreover, with respect to AC coefficients of AC1–AC15, those coefficients are divided by 2 (re-quantization).

Thus, the following expression is obtained.

| 306.5 | 0 | 7 | 0 |
|---|---|---|---|
| 0 | 0 | 0 | 0 |
| 0 | 0 | 0 | 0 |
| 0 | 0 | 0 | 0 |

(1-2)

When rounding is implemented thereto, DC coefficient becomes equal to 307. Namely,

| 307 | 0 | 7 | 0 |
|---|---|---|---|
| 0 | 0 | 0 | 0 |
| 0 | 0 | 0 | 0 |
| 0 | 0 | 0 | 0 |

Inverse-quantization is implemented thereto. With respect to DC coefficient, this DC coefficient is multiplied by 4, whereby 1228 is obtained. Accordingly, by the quantization/ inverse quantization, change of DC coefficient with respect to the input becomes equal to 2, i.e., rounding error becomes Erc (=0.5)×4. Namely, change of this DC coefficient becomes change by processing of coefficient plane. Moreover, with respect to AC coefficients, those AC coefficients are multiplied by 2, 14 is obtained. Namely, the following expression is given:

| 1228 | 0 | 14 | 0 |
|---|---|---|---|
| 0 | 0 | 0 | 0 |
| 0 | 0 | 0 | 0 |
| 0 | 0 | 0 | 0 |

(1-3)

Here, AC coefficients are assumed to be expressed as follows.

| 0 | 0 | 14 | 0 |
|---|---|---|---|
| 0 | 0 | 0 | 0 |
| 0 | 0 | 0 | 0 |
| 0 | 0 | 0 | 0 |

When Inverse Transform (IDCT) is implemented thereto, the following expression is obtained.

| 3.5 | −3.5 | −3.5 | 3.5 |
|---|---|---|---|
| 3.5 | −3.5 | −3.5 | 3.5 |
| 3.5 | −3.5 | −3.5 | 3.5 |
| 3.5 | −3.5 | −3.5 | 3.5 |

(1-4)

Moreover, DC coefficient is assumed to be as follows.

| 1228 | 0 | 0 | 0 |
|---|---|---|---|
| 0 | 0 | 0 | 0 |
| 0 | 0 | 0 | 0 |
| 0 | 0 | 0 | 0 |

When Inverse Transform (IDCT) is implemented thereto, the following expression is obtained.

| 307.0 | 307.0 | 307.0 | 307.0 |
|---|---|---|---|
| 307.0 | 307.0 | 307.0 | 307.0 |
| 307.0 | 307.0 | 307.0 | 307.0 |
| 307.0 | 307.0 | 307.0 | 307.0 |

(1-5)

When the above-mentioned formula (1-3), i.e., IDCT output of AC coefficient and the above-mentioned formula (1-4), i.e., IDCT output of DC coefficient are added, the boundary points of the above-mentioned formula (1-3), i.e., IDCT output of AC coefficients are all caused to undergo processing which is positive in polarity. Accordingly, change in this case is converted into change of DC coefficient.

Change by this rounding processing is expressed as follows:

| 0.5 | 0.5 | 0.5 | 0.5 |
|---|---|---|---|
| 0.5 | 0.5 | 0.5 | 0.5 |
| 0.5 | 0.5 | 0.5 | 0.5 |
| 0.5 | 0.5 | 0.5 | 0.5 |

When such change values are caused to undergo DCT, the following expression is obtained.

| 2 | 0 | 0 | 0 |
|---|---|---|---|
| 0 | 0 | 0 | 0 |
| 0 | 0 | 0 | 0 |
| 0 | 0 | 0 | 0 |

Namely, 2 of DC coefficient becomes change by processing of space plane.

(1-6)

From the above-mentioned formula (1-2), i.e., 2 of DC coefficient transform value and the above-mentioned formula (1-5), i.e., 2 of DC coefficient change by DCT after converted into change of DC coefficient, (change by processing of coefficient plane)+(change by processing of space plane)=4. This corresponds to one quantization step of DC coefficient. Accordingly, DC coefficient changes as follows.

$$1226 \rightarrow 1230$$

(1-7)

It should be noted that, by converting change of boundary points of AC coefficients of the above-mentioned formula (1-3) into DC coefficient, this AC coefficient is returned onto the coefficient plane in a manner to take exactly the same value (=14).

Accordingly, the expression in this case is as follows.

| 1230 | 0 | 14 | 0 |
|---|---|---|---|
| 0 | 0 | 0 | 0 |
| 0 | 0 | 0 | 0 |
| 0 | 0 | 0 | 0 |

(1-8)

As stated above, AC coefficient of the above-mentioned formula (1-3) behaves like catalyst so that entirely the same cycle repeats at the second operation (second transform/ inverse transform processing, first dubbing processing) and operations subsequent thereto. Accordingly, by this repetition, all picture samples monotonously increase.

Actual example 2 in which rounding errors are accumulated is taken and explanation will be given in connection therewith.

In the actual example 2, quantization step of DC coefficient is assumed to be qdc=2 and quantization step of AC coefficient is assumed to be qac=2.

This is the example where 8 samples in total monotonously decrease at the first row and the fourth row of picture block, and is complicated as compared to the actual example 1.

Input at this example 2 is assumed to be expressed as follows.

| DC   | AC1  | AC2  | AC3  |   | −112 | −113 | −112 | −112 |
|------|------|------|------|---|------|------|------|------|
| AC4  | AC5  | AC6  | AC7  | = | −113 | −113 | −112 | −111 |
| AC8  | AC9  | AC10 | AC11 |   | −113 | −113 | −112 | −112 |
| AC12 | AC13 | AC14 | AC15 |   | −112 | −112 | −112 | −112 |

(2-1)

DCT output obtained by allowing this input to undergo DCT is expressed as follows.

| −499.00  | −1.3750  | 0.5000   | 0.5625  |
|----------|----------|----------|---------|
| −0.1875  | −0.3750  | 0.4375   | 0.3750  |
| 0.5000   | 1.1250   | 0.0000   | 0.0625  |
| −0.4375  | 0.3750   | −0.1875  | 0.3750  |

DC coefficient of this DCT output becomes equal to −499. When this coefficient is divided by 2 (re-quantization), −224.5 is obtained. Moreover, also with respect to AC coefficients, those coefficients are divided by 2 (re-quantization). Thus, the following expression is obtained.

| −224.500 | −0.68750 | 0.25000  | 0.28125 |
|----------|----------|----------|---------|
| −0.09375 | −0.18750 | 0.28175  | 0.18750 |
| 0.25000  | 0.56250  | 0.00000  | 0.03125 |
| −0.21875 | 0.18750  | −0.09375 | 0.18750 |

(2-2)

When rounding processing is implemented thereto, −225 is obtained with respect to DC coefficient. Namely, the following expression is obtained.

| −225 | −1 | 0 | 0 |
|------|----|---|---|
| 0    | 0  | 0 | 0 |
| 0    | 1  | 0 | 0 |
| 0    | 0  | 0 | 0 |

Inverse quantization is implemented thereto. With respect to DC coefficient, this coefficient is multiplied by 2. Thus, −450 is obtained. Namely,

| −450 | −2 | 0 | 0 |
|------|----|---|---|
| 0    | 0  | 0 | 0 |
| 0    | 2  | 0 | 0 |
| 0    | 0  | 0 | 0 |

Accordingly, by the quantization/inverse quantization, change of DC coefficient with respect to the input becomes Ercx2=−1. This change of DC coefficient becomes change by processing of coefficient plane.

(2-3)

Moreover, after inverse quantization, AC1=−2 and AC9=2 of AC coefficients are left except for DC coefficient. Here, AC coefficients are assumed to be expressed as follows

| 0 | −2 | 0 | 0 |
|---|----|---|---|
| 0 | 0  | 0 | 0 |
| 0 | 2  | 0 | 0 |
| 0 | 0  | 0 | 0 |

When Inverse Transform (IDCT) processing is implemented thereto, the following expression is obtained.

| 0.000000  | 0.000000  | 0.000000 | 0.000000 |
|-----------|-----------|----------|----------|
| −1.306563 | −0.541196 | 0.541196 | 1.306563 |
| −1.306563 | −0.541196 | 0.541196 | 1.306563 |
| 0.000000  | 0.000000  | 0.000000 | 0.000000 |

(2-4)

Moreover, DC coefficient is assumed to be expressed as follows.

| −450 | 0 | 0 | 0 |
|------|---|---|---|
| 0    | 0 | 0 | 0 |
| 0    | 0 | 0 | 0 |
| 0    | 0 | 0 | 0 |

When Inverse Transform (IDCT) processing is implemented thereto, the following expression is obtained.

| −112.5 | −112.5 | −112.5 | −112.5 |
|--------|--------|--------|--------|
| −112.5 | −112.5 | −112.5 | −112.5 |
| −112.5 | −112.5 | −112.5 | −112.5 |
| −112.5 | −112.5 | −112.5 | −112.5 |

Moreover, the result of Inverse Transform (IDCT) of this DC coefficient can be expressed as follows.

|   | −112.5 | −112.5 | −112.5 | −112.5 |   |      |      |      |      |
|---|--------|--------|--------|--------|---|------|------|------|------|
|   | −112.5 | −112.5 | −112.5 | −112.5 |   | ... (2-4-1) |  |  |  |
|   | −112.5 | −112.5 | −112.5 | −112.5 |   |      |      |      |      |
|   | −112.5 | −112.5 | −112.5 | −112.5 |   |      |      |      |      |
|   | −112.5 | −112.5 | −112.5 | −112.5 |   | 0    | 0    | 0    | 0    |
| = | −112.0 | −112.0 | −112.0 | −112.0 | + | −0.5 | −0.5 | −0.5 | −0.5 |
|   | −112.0 | −112.0 | −112.0 | −112.0 |   | −0.5 | −0.5 | −0.5 | −0.5 |
|   | −112.5 | −112.5 | −112.5 | −112.5 |   | 0    | 0    | 0    | 0    |
|   |        |        |        |        |   | ... (2-4-2) |  |  |  |

(2-5)

Here, IDCT output of AC coefficient of the above-mentioned formula (2-3) and IDCT output of DC coefficient of the second term of the above-mentioned formula (2-4-2), i.e.,

| 0 | 0 | 0 | 0 |
| -0.5 | -0.5 | -0.5 | -0.5 |
| -0.5 | -0.5 | -0.5 | -0.5 |
| 0 | 0 | 0 | 0 | are added. When rounding processing is implemented to added output, the following expression is obtained.

| 0 | 0 | 0 | 0 |
| -2 | -1 | 0 | 1 |
| -2 | -1 | 0 | 1 |
| 0 | 0 | 0 | 0 |

When the rounded result is transformed, the following expression is obtained.

| -1.000 | -2.230 | 0.000 | -0.158 |
| 0.000 | 0.000 | 0.000 | 0.000 |
| 1.000 | 2.230 | 0.000 | 0.158 |
| 0.000 | 0.000 | 0.000 | 0.000 |

(2-6)

Moreover, change by the processing (rounding of the first term of (2-4-2)) of boundary points of the above-mentioned formula (2-4) is expressed as follows.

| -0.5 | -0.5 | -0.5 | -0.5 |
| 0 | 0 | 0 | 0 |
| 0 | 0 | 0 | 0 |
| -0.5 | -0.5 | -0.5 | -0.5 |

When the above-mentioned expression is transformed, the following expression is obtained as follows.

| -1 | 0 | 0 | 0 |
| 0 | 0 | 0 | 0 |
| -1 | 0 | 0 | 0 |
| 0 | 0 | 0 | 0 |

(2-7)

From the above-mentioned formulas (2-2) and (2-6), change of DC coefficient becomes equal to −2 with respect to both the coefficient plane and the space plane, which corresponds to one quantization step. Here, component by processing of space plane newly appears in AC8 of AC coefficients.

(2-8)

Moreover, in accordance with the result of the above-mentioned formula (2-6), the above-mentioned formula (2-5) is expressed below as the result of the fact that rounded result is included thereinto.

| -1 | -2 | 0 | 0 |
| 0 | 0 | 0 | 0 |
| 1 | 2 | 0 | 0 |
| 0 | 0 | 0 | 0 |

This resultantly serves as catalyst of this cycle.

(2-9)

When the second transform processing is similarly carried out, DC=−451, AC8=−1 are obtained. When these coefficient values are quantized by 2, DC=−225.5 and AC8=−0.5 are obtained.

(2-10)

The quantized coefficient values are rounded so that DC=−226 and AC8=−1 are obtained. When inverse quantization is implemented thereto, DC=−452 and AC8=−2 are obtained. Changes respectively become Er$c\times 2$=−1.

(2-11)

When the portion where components of catalyst overlap with each other is subtracted from the coefficients of DC and AC8, the following expression is obtained as follows:

| -451 | 0 | 0 | 0 | 0 |
| 0 | 0 | 0 | 0 | 0 |
| -3 | 0 | 0 | 0 | 0 |
| 0 | 0 | 0 | 0 | 0 |

When this expression is inverse-transformed, the following expression is obtained.

| -113.5 | -113.5 | -113.5 | -113.5 |
| -112.0 | -112.0 | -112.0 | -112.0 |
| -112.0 | -112.0 | -112.0 | -112.0 |
| -113.5 | -113.5 | -113.5 | -113.5 |

Values of transform processing by processing of the boundary point are as indicated by the above-mentioned formula (2-6).

(2-12)

From the results of the above-mentioned formula (2-10) and the above-mentioned formula (2-11), DC and AC8 are both −2 with respect to both coefficient plane and space plane, which correspond to change of one quantization step.

(2-13)

Components of catalyst do not change even if transform/inverse transform processing are repeated. At times subsequent thereto, cycle of the above-mentioned formulas (2-8)~(2-13) are repeated.

The condition of accumulation cycle where rounding errors are accumulated as in the above-described actual example will now be described.

Initially, let consider the condition of accumulation cycle. As indicated in the above-described actual example, relation of coefficients relating to the accumulation cycle is very complicated. Here, in order to closely examine picture emphasis pattern, various conditions are determined. This also corresponds to explanation of way of thinking of measure with respect to accumulation of rounding errors in the embodiment of this invention (i.e., the reason why rounding in even number direction is used).

First, since transform and inverse transform (DCT-IDCT) processing have sufficient operation accuracy, there is no accumulation of errors except for boundary points in rounding. Accordingly, only boundary point in rounding participates in the accumulation cycle.

Secondly, change by processing of boundary point of space plane is added to change by processing of boundary point of coefficient plane, thereby recursively bringing about shift of one quantization step on the coefficient plane. When any component except for boundary point of space plane is included in change of the former processing, increment of boundary point by rounding of the space plane is not returned (exerted on) to the boundary point of coefficient plane for a second time from symmetry of DCT-IDCT. As a result, accumulation cycle is cut off. Accordingly, accumulation cycle takes place only when boundary point of space plane exists on the coefficient plane and boundary point of coefficient plane exists on the space plane.

Figure 1:
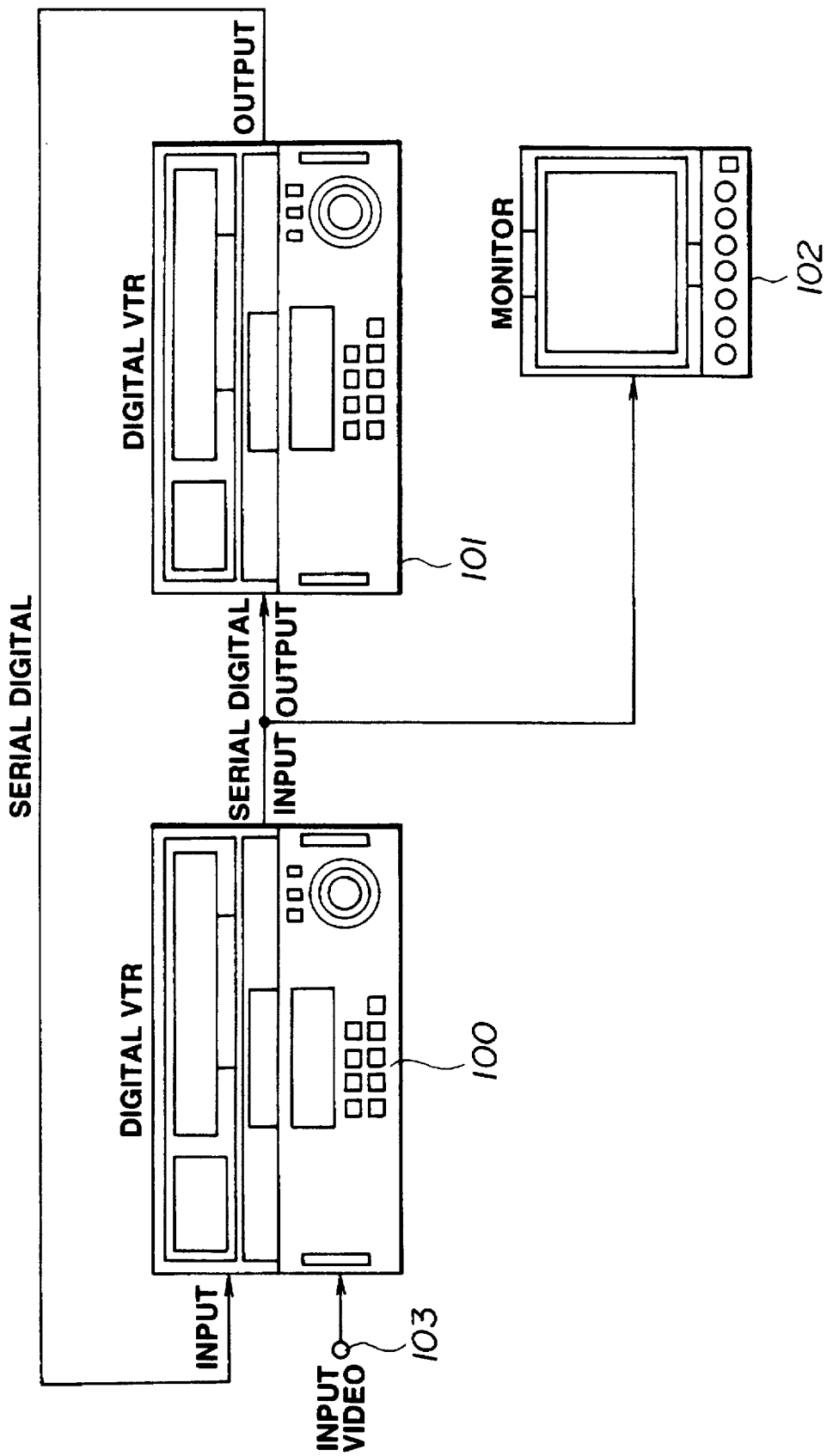
FIG. 1 is a view showing the configuration at the time of direct digital dubbing of digital VTR.
Figure 2:
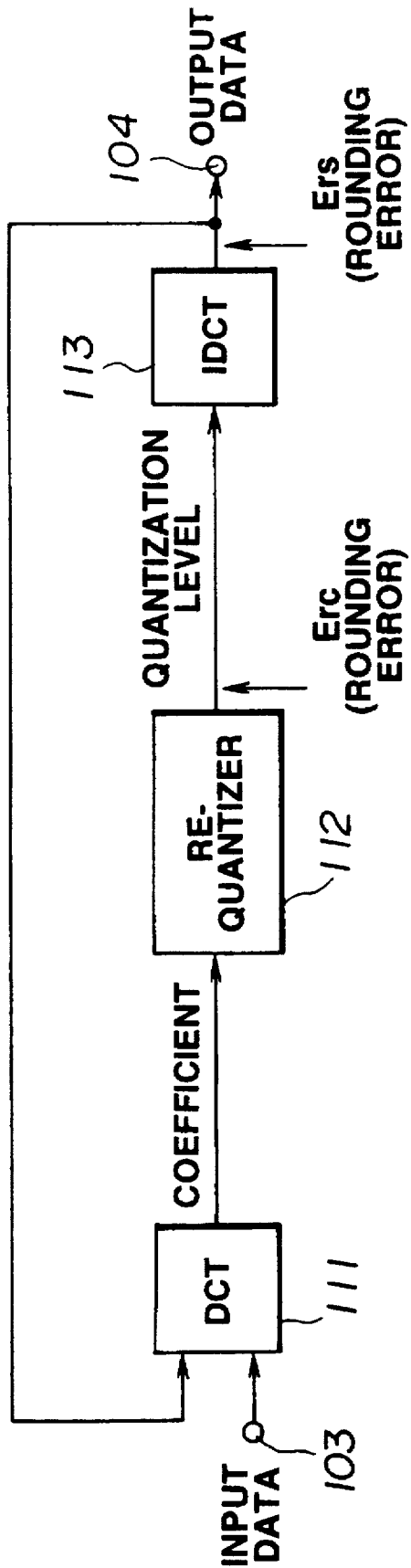
FIG. 2 is a block circuit diagram showing, in simplified manner, the configuration of direct digital dubbing.
Figure 3:
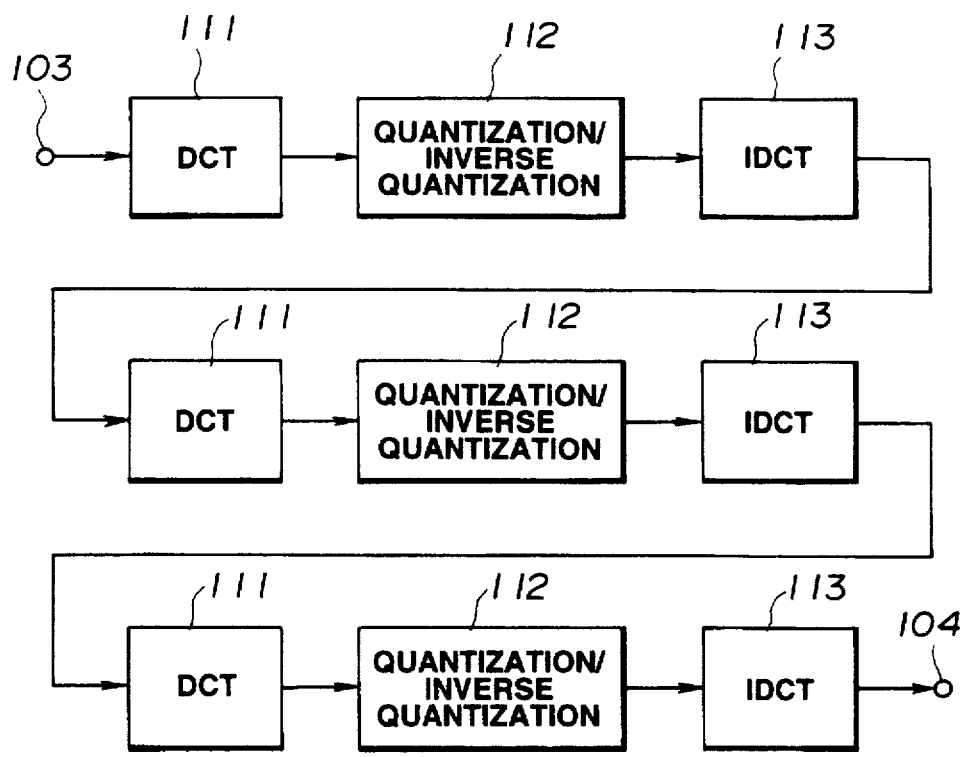
FIG. 3 is a block circuit diagram for explaining flow in the case of carrying out two times of dubbing operations.
Figure 4:
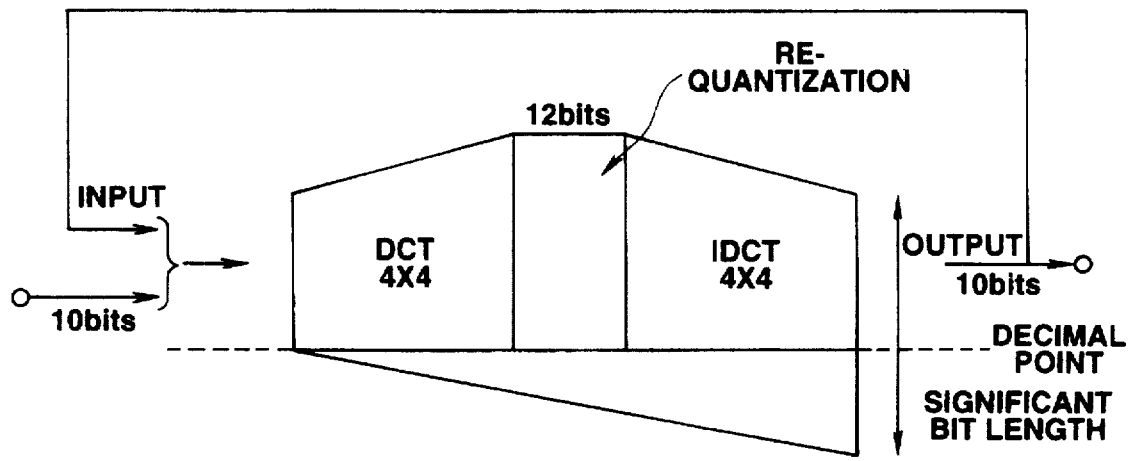
FIG. 4 is a view showing, in a conceptual manner, the relationship between input/output word length and significant digit of normalized simulation model in DCT-IDCT.
Figure 5A:
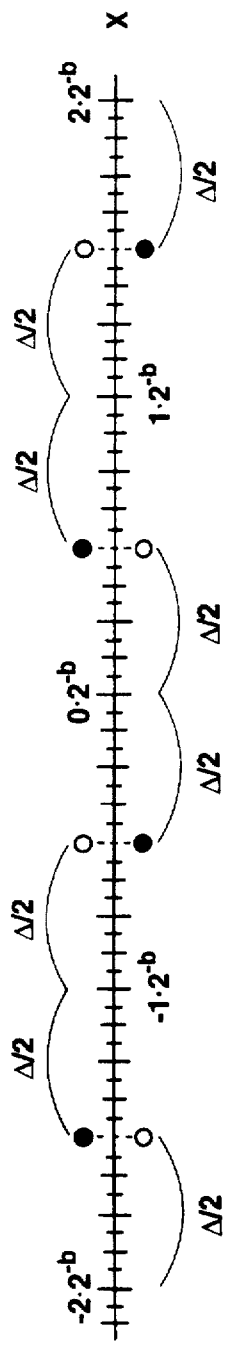
FIGS. 5A–5C are a view for explaining rounding in positive direction.
Figure 5C:
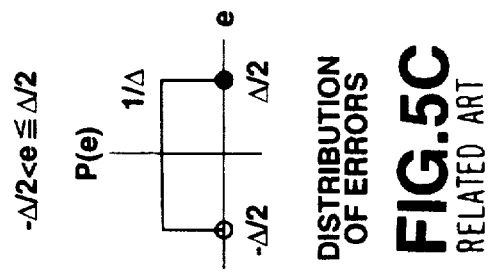
Figure 5B:
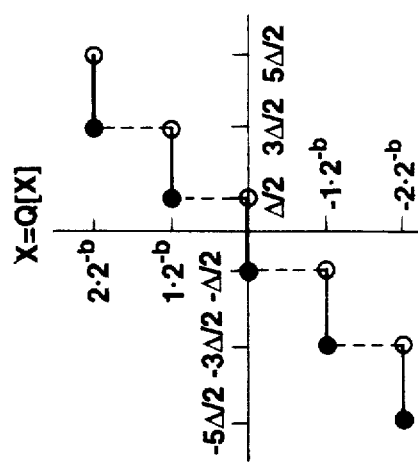

Thirdly, when, e.g., quantization step size qxx is 3, distribution of errors falls within the digit oriented error range as shown in FIG. 3.

For example, if the range of error of qxx=4 is $-\Delta/2 \sim \Delta/2$, when qxx=3 in the FIG. 3 mentioned above, the range of error is expressed as follows:

$$(-3/4) \times (\Delta/2) \sim (3/4) \times (\Delta/2)$$

If the range of error of qxx=2 is $-\Delta'/2 \sim \Delta'/2$, the above-mentioned range of error is expressed as follows:

$$(-3/2) \times (\Delta'/2) \sim (3/2) \times (\Delta'/2)$$

Fourthly, when consideration is made in connection with the range on the space plane within which change by boundary point processing of coefficient plane should fall in order to cause accumulation cycle, e.g., the influence of error 0.5 of boundary point of coefficient plane has been assumed to be 2.5 on the space plane. On the space plane, such error value is rounded into 3.0. Error by rounding at this time is 0.5. Since DCT/IDCT are symmetrical and reversible, error value becomes E=0.5/5=0.1 on the next coefficient plane. As a result, accumulation cycle of the boundary point is cut off.

On the other hand, when there results boundary point of space plane without taking a transfer form, E=0.5 is provided by similar calculation. As a result, accumulation cycle is not cut off.

|  | Coefficient Plane | → | Space Plane | → | Coefficient Plane |
|---|---|---|---|---|---|
| Transfer | Erc = 0.5 |  | (ex)2.5→3.0 |  | Ers = 0.5<br>E = 0.1 |
| Non-transfer | Erc = 0.5 |  | (ex)0.5→1.0 |  | Ers = 0.5<br>E = 0.5 |

Accordingly, it is seen that only when the influence by error of coefficient plane falls within one quantization step on the space plane, accumulation cycle takes place. When qdc≠qac, greater quantization is quantization at that time.

Results obtained with real pictures shown in the above-described actual example are in conformity with the above.

From facts as described above, space plane output is shifted to one side in polarity by DC coefficient. As a result, processing of boundary point by rounding of the space plane is converted into processing of one side in polarity, thereby shifting mean value of errors. This is the great factor to cause monotonous increase (decrease).

As described above, the accumulation cycle takes place when processing is rounding which is integer operation (non-linear processing), and is very special case where respective coefficients of coefficient plane and space plane samples are satisfactorily related to each other. This is the case which is low from a viewpoint of probability. As the fact that this is low probability case is supported, it cannot be said that such phenomenon takes place at all times even with respect to any pattern, and picture emphasis patters confirmed by real picture are patterns in the first, second and third conditions described in the condition of the accumulation cycle.

The cause in which the accumulation cycle takes place resides in employment of method of balancing the distribution of errors by polarity of positive and negative (i.e., rounding in infinity direction). In the bit rate reduction system utilizing transform encoding, there is no close correspondence relationship except for DC coefficient between polarity of the coefficient plane and polarity of the space plane. There are instances where the influence of processing of boundary point by combination of coefficients is converted into processing one side in polarity at all times on the space plane. As a result, distribution of errors does not incline in a balance direction thereof, but deviates in one direction. Errors resulting therefrom are accumulated.

In this way, cycle of monotonous increase/decrease of specific picture pattern is constructed by the accumulation cycle, thus failing to realize complete re-construction irrespective of operation accuracy of transform processing.

Further, since picture pattern emphasized by monotonous increase or decrease becomes geometric pattern, picture quality of multi-generation is greatly injured.

From facts as described above, in this embodiment, a method of balancing distribution of errors irrespective of polarity on the space plane is employed.

Namely, in this embodiment, a method of balancing distribution of errors with even number value being as reference for rounding of output of space plane, i.e., rounding in even number direction is employed. It should be noted that, as a method of balancing distribution of errors irrespective of polarity on the space plane, a method of balancing distribution of errors with odd number being as reference for rounding of output of space plane, i.e., rounding in odd number direction may be employed.

By such measure, complete re-construction of digital direct dubbing is realized.

Figure 10:
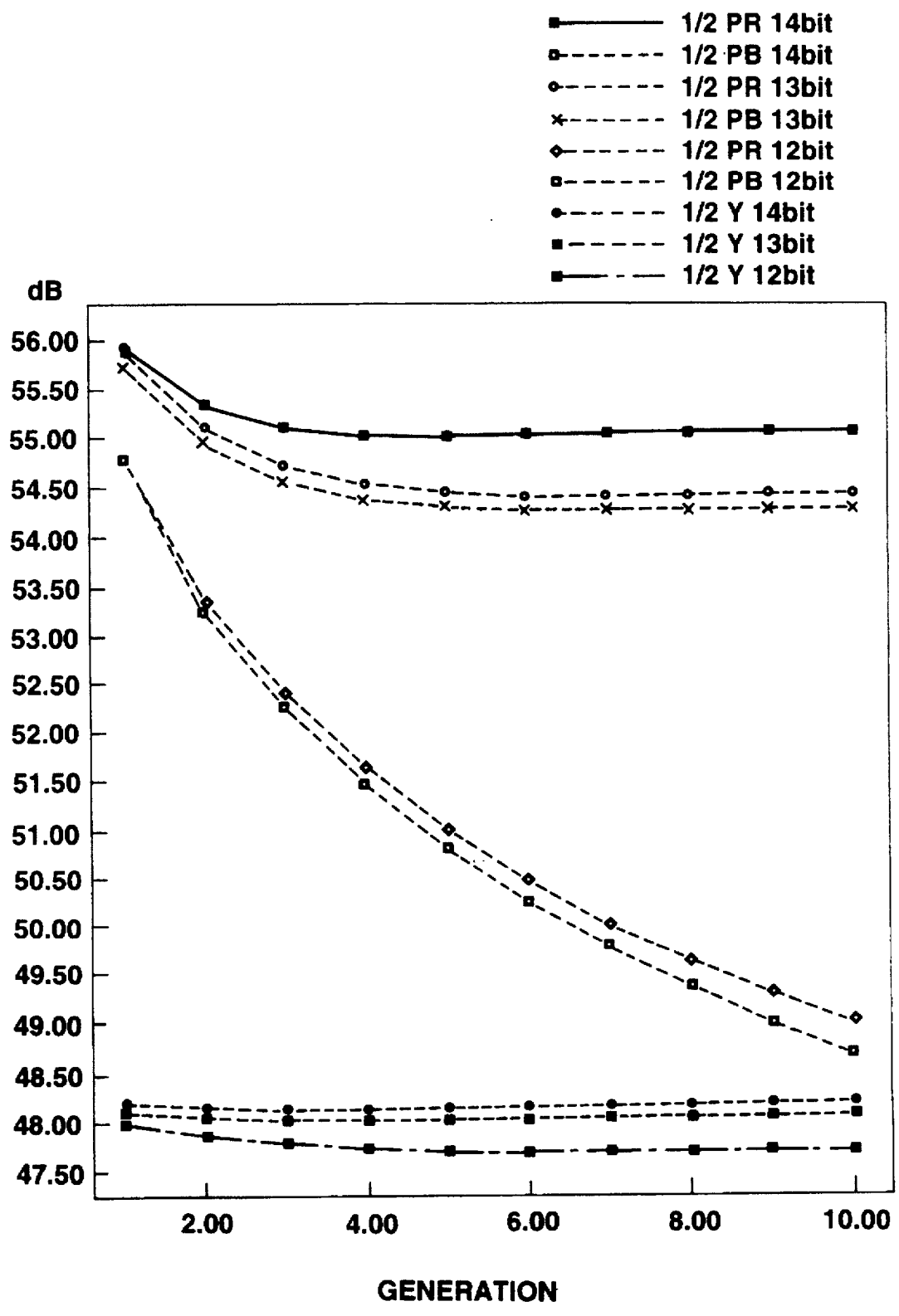
FIG. 10 is a view showing simulation result of multi-dubbing when DCT and rounding in positive direction are used.

FIG. 10 shows the state of degradation of S/N of Y signal and PR/PB signal of video signal in the case where dubbing is straight repeated (simulation result after a plurality of dubbing operations) when operation accuracy of DCT is 12 bits, 13 bits and 14 bits. Evaluation picture has compression rate of ½. In this simulation, operations of DCT, IDCT are carried out by floating-point, and rounding into integer uses function based on IEEE 754 standard, but rounding is carried out by method of simple rounding (rounding in positive direction) in quantization.

Figure 11:
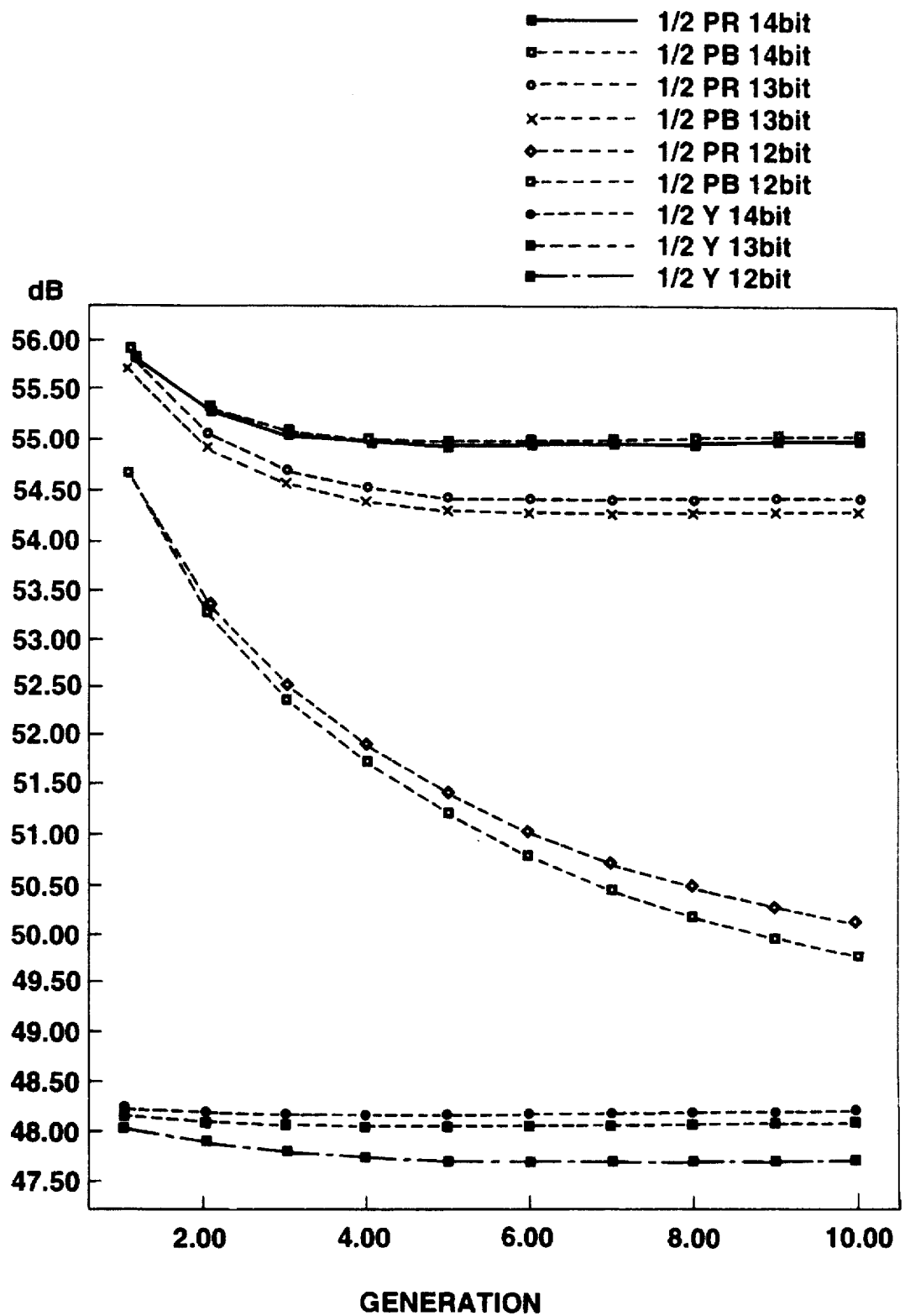
FIG. 11 is a view showing simulation result of multi-dubbing when DCT and rounding in infinity direction are used.
Figure 12:
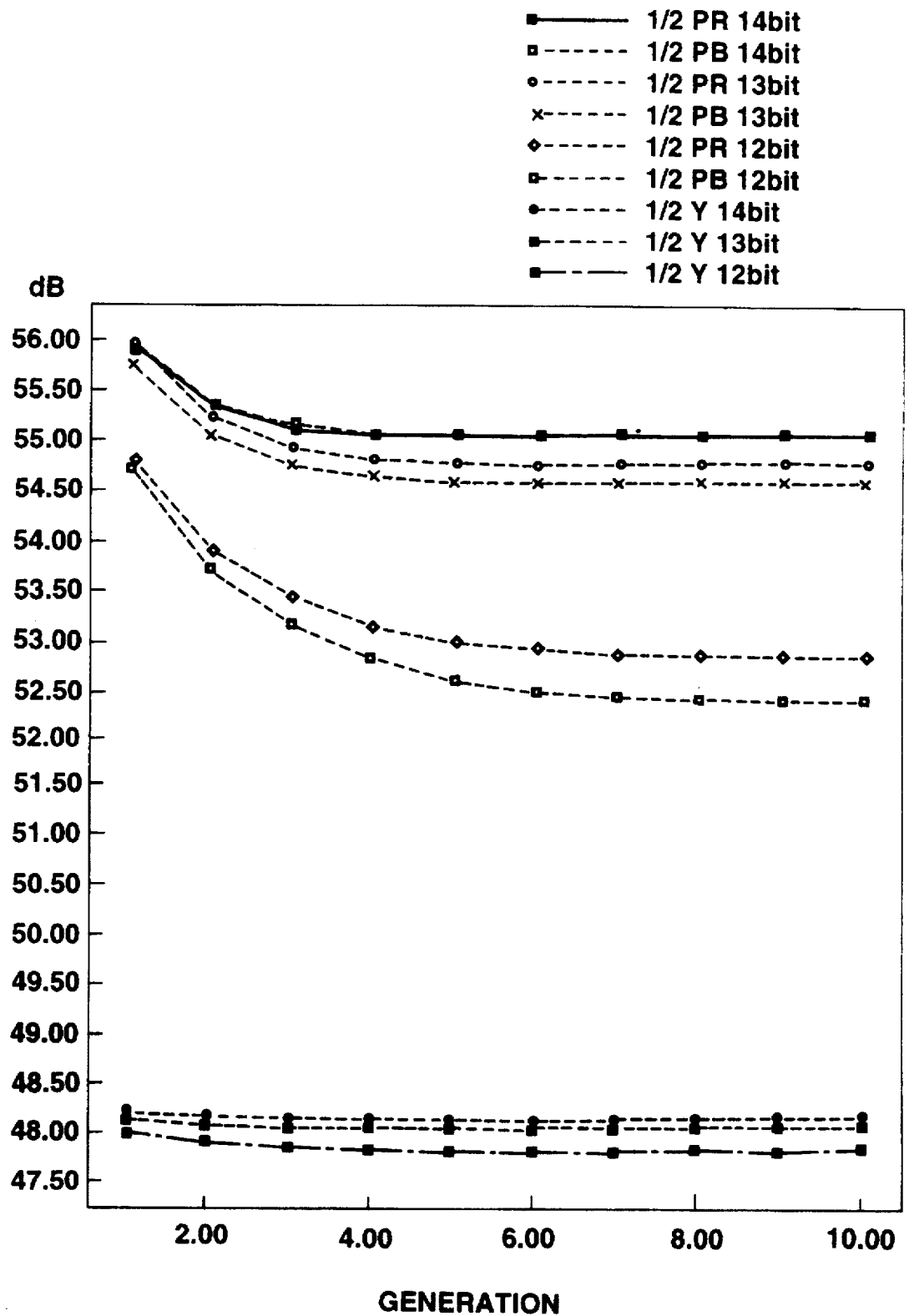
FIG. 12 is a view showing simulation result of multi-dubbing when DCT and rounding in even number direction are used.

Moreover, simulation result in the case where rounding in infinity direction is used is shown in FIG. 11, and simulation result in the case where rounding in even number direction is used in this embodiment is shown in FIG. 12.

In the case of rounding in infinity direction shown in FIG. 11, curve of S/N deterioration becomes gentle although degree of gentleness is slight as compared to the case of rounding in positive direction shown in FIG. 10.

Figure 13:
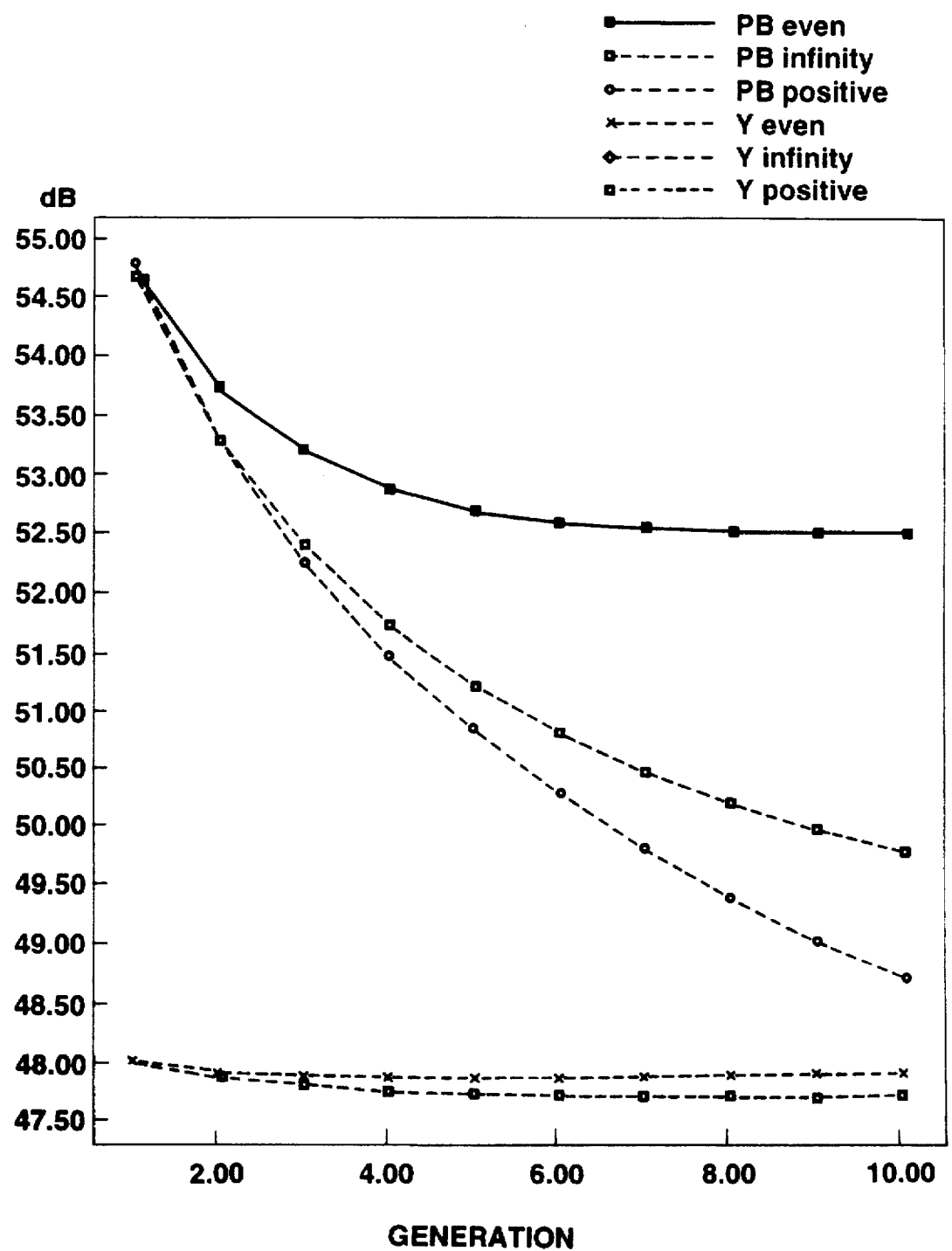
FIG. 13 is a view showing simulation result of multi-dubbing when DCT at the time of 12 bits of operation accuracy, rounding in even number, direction, rounding in infinity direction and rounding in positive direction are used.

On the contrary, in rounding in even number direction employed in this embodiment shown in FIG. 12, degradation of S/N becomes gentle as compared to the rounding in positive direction or the rounding in infinity direction, and data is converged at early generation. It is seen that greater effect is provided particularly in the case of 12 bits in which operation accuracy of DCT is low as shown in FIG. 13. Additionally, simulation results of rounding in infinity direction and rounding in positive direction are shown together in FIG. 13.

Moreover, while DCT is used in the above-described embodiment, bit reduction by so called Wavelet transform is more excellent in picture quality as compared to DCT. Since particularly Wavelet transform by so called Harr base can be realized by addition and subtraction of integers, and is permitted to undergo frequency decomposition after block division is carried out in the same manner as DCT, hardware scale can be also reduced.

In view of this, the portion of DCT in the above-described embodiment is replaced by 10 division Discrete Wavelet Transform (DWT) of 8×8 by the Hart base, thus to carry out simulation. It should be noted that operation accuracy of DWT is 14 bits at maximum unlike DCT, and no rounding error takes place in this case. Since the same rounding system as that of quantization is employed in DWT, IDWT, there are three rounding portions. These rounding operations are compared in connection with the rounding in positive direction, the rounding in infinity direction and the rounding in even number direction.

Figure 14:
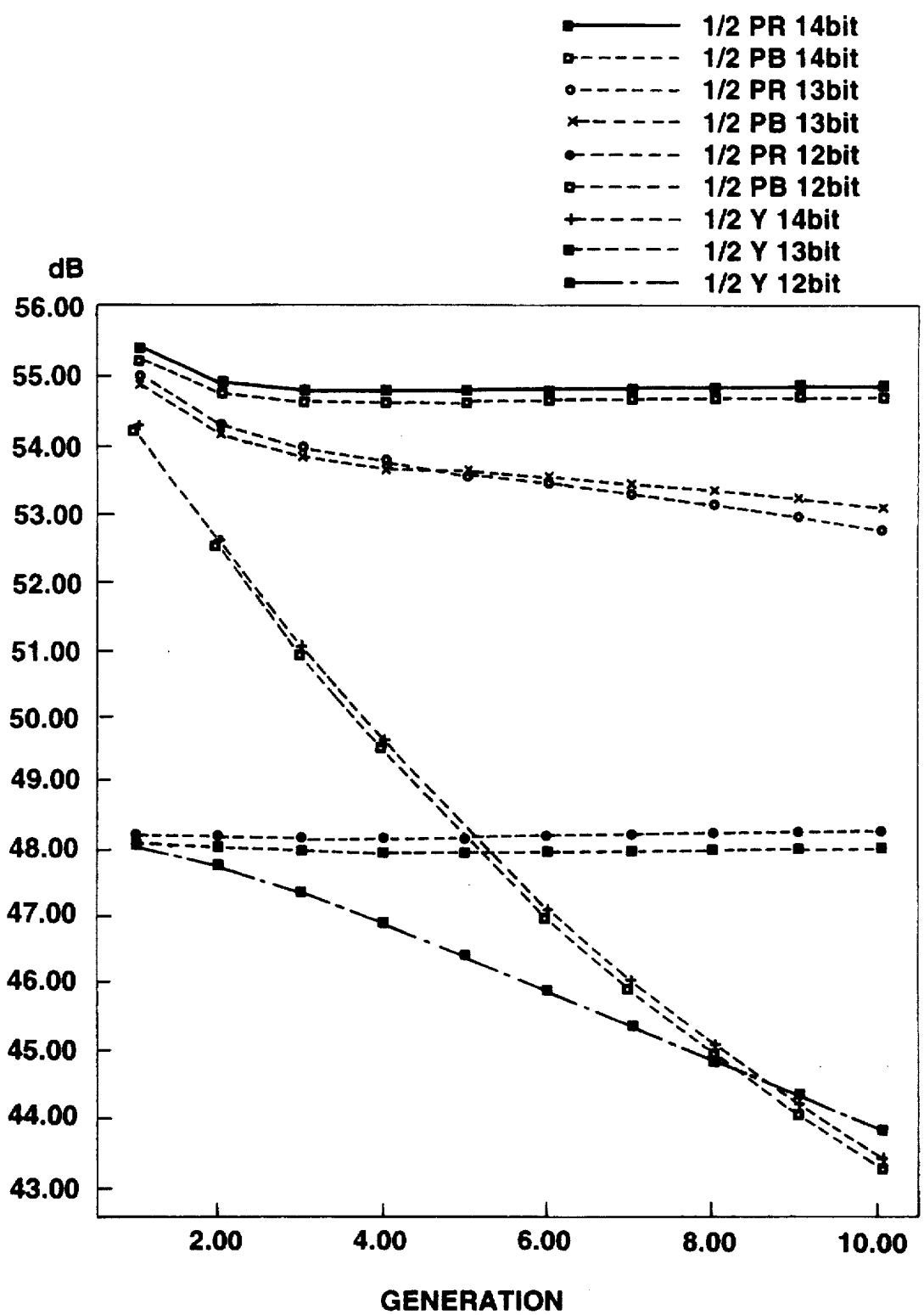
FIG. 14 is a view showing simulation result of multi-dubbing when DWT and rounding in positive direction are used.
Figure 15:
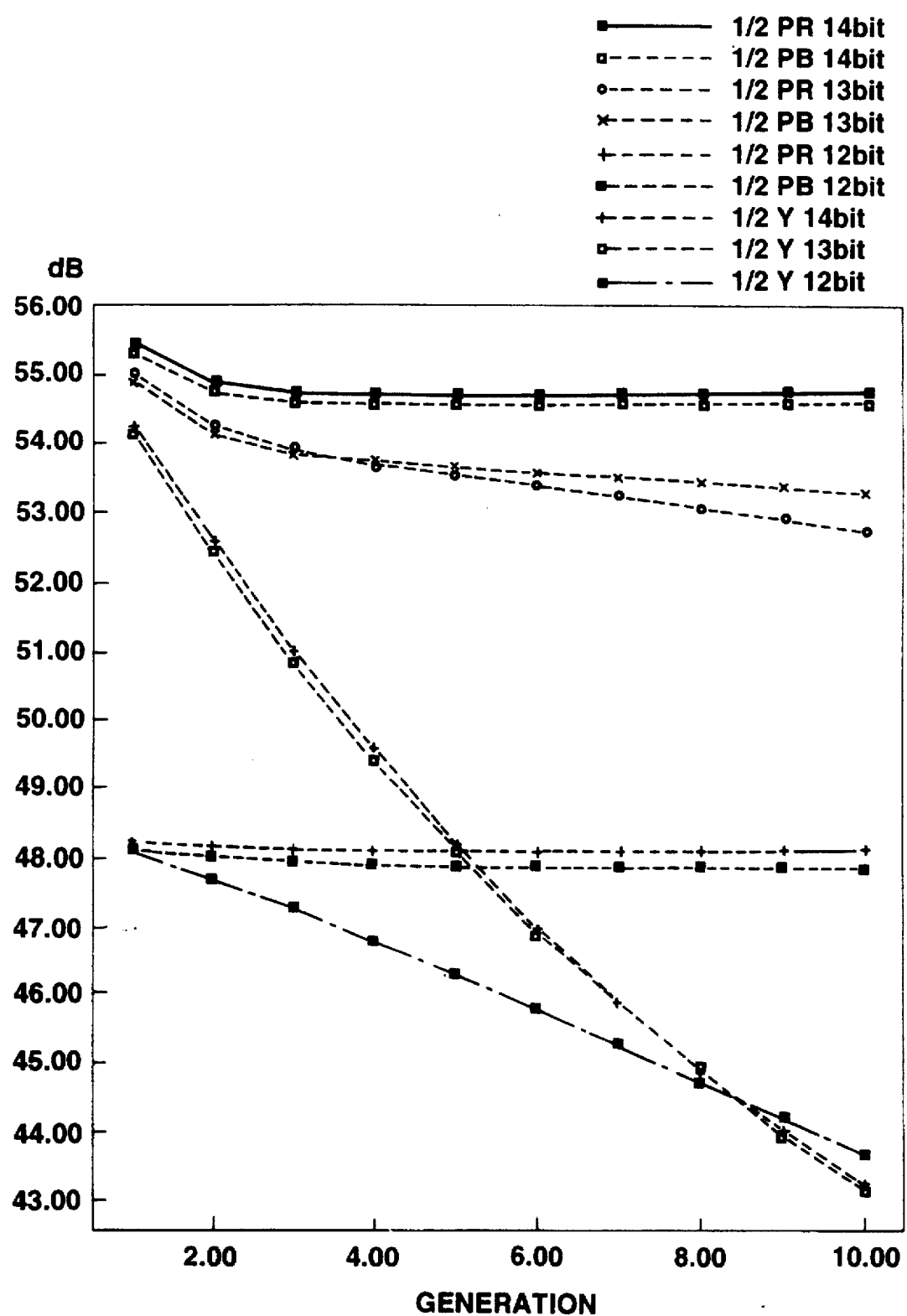
FIG. 15 is a view showing simulation result of multi-dubbing when DWT and rounding in infinity direction are used.
Figure 16:
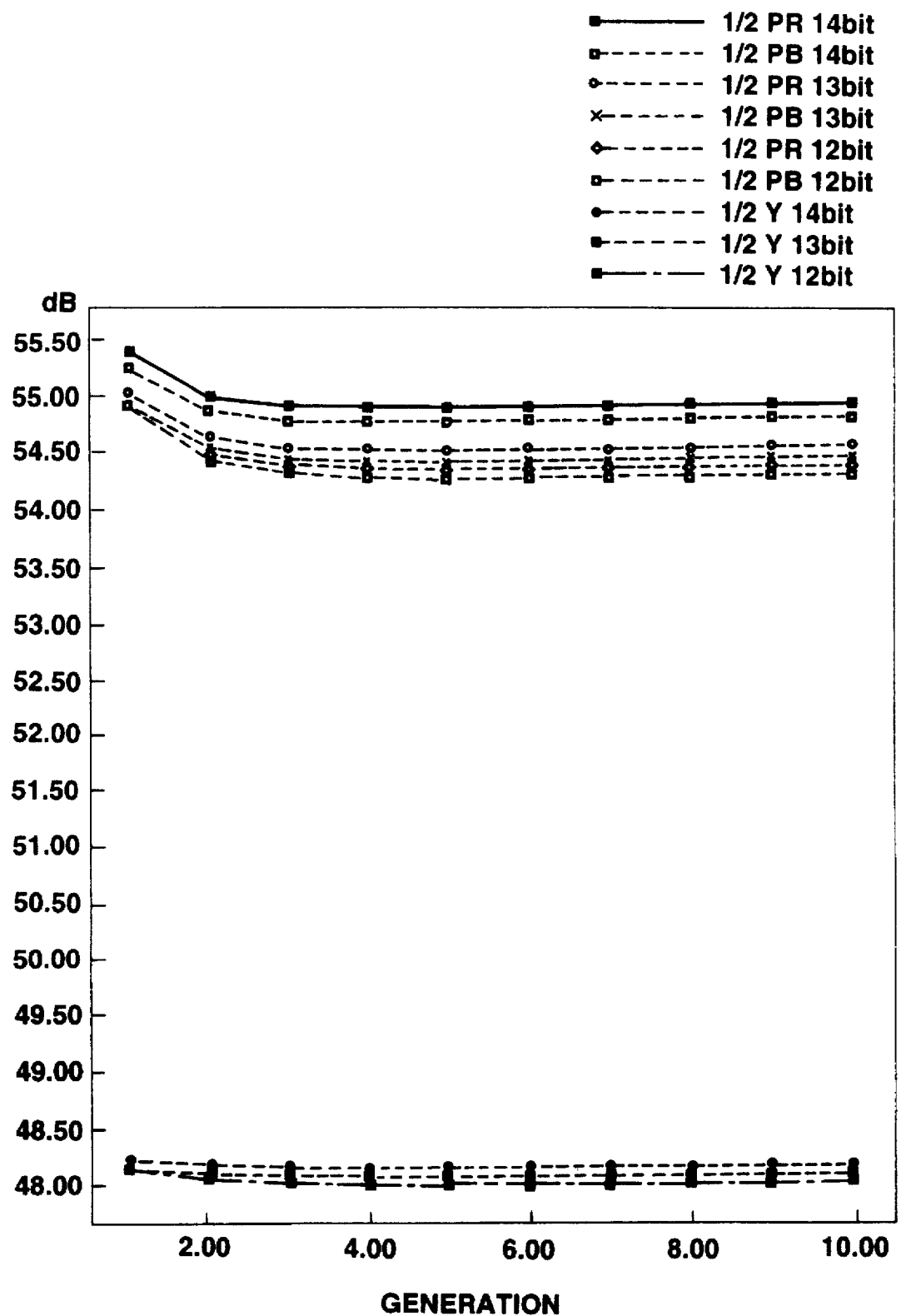
FIG. 16 is a view showing simulation result of multi-dubbing when DWT and rounding in even number direction are used.
Figure 17:
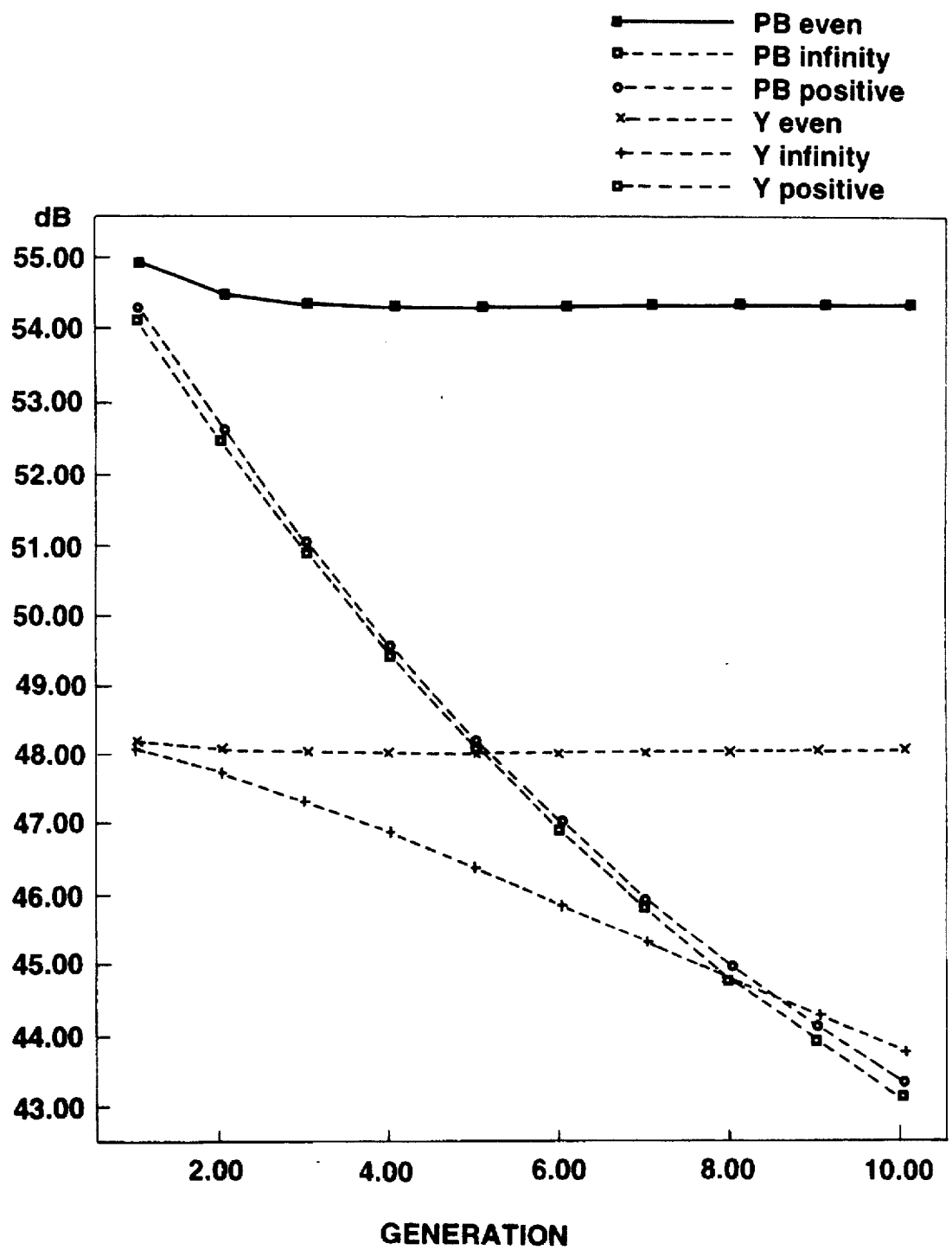
FIG. 17 is a view showing simulation result of multi-dubbing when DWT at the time of operation accuracy 12 bits, rounding in even number direction, rounding in infinity direction and rounding in positive direction are used.

The results are as shown in FIGS. 14~17. It is to be noted that evaluation picture and compression ratio are the same as those of the above-described DCT. Moreover, in FIGS. 14~17, there is shown simulation result in the case where Y, PB, PR signals of video signal are used and dubbing is straight repeated when operation accuracy of DWT is 12 bits, 13 bits and 14 bits. The case using rounding in positive direction is shown in FIG. 14, the case where rounding in infinity direction is used is shown in FIG. 15, and the case where rounding in even number direction is used. In FIG. 17, there is shown simulation results of rounding in even number direction, rounding in infinity direction and rounding in positive direction in the case of 12 bits in which operation accuracy of DWT is low.

From these FIGS. 14~17, it is seen that the rounding in positive direction and the rounding in infinity direction show the same tendency, degradation of S/N is great at DWT operation accuracy 12 bits, and operation errors are accumulated to more degree according as and generations overlap with each other.

On the contrary, in the rounding in even number direction, deterioration of S/N is small even at 12 bits, and data is converged at the third~fourth generations.

From pacts as described above, it is seen that even in the case where operation accuracy is insufficient, as compared to conventional rounding (rounding in positive direction or rounding in infinity direction), even number rounding (odd number rounding) has less accumulation of errors. This is because since according as bits to be rounded off become lesser, the probability that 0.5 takes place becomes higher, the effect of rounding in even number direction is exhibited to more degree.

In VTR for carrying out bit rate reduction where high picture quality is required, it is desirable to ensure sufficient operation accuracy and to carry out rounding in even number direction. Also in the case where transform/inverse transform are repeated as in the matrix transformation, the rounding in even number direction is effective for reducing accumulated error quantity.

As described above, in the embodiment of this invention, rounding in even number direction (or rounding in odd number direction) is used in transform encoding sufficiently having operation accuracy, thereby making it possible to prevent accumulation of the influence by processing of boundary points which is singular points in rounding. Thus, monotonous increase/decrease of amplitude of fixed picture pattern can be prevented. By this effect, it is possible to realize transform system in which even if complete reconstruction, i.e., multi-generation is carried out many times, there is no picture deterioration. In other words, in continuous connection of plural times of efficient encoding/ decoding apparatuses, picture deterioration is held down to minimum level so that data can be converged into fixed value.

It is to be noted since this invention is common not only to digital VTR, but also to system employing bit reduction by transform encoding, this invention can be also applied to other similar systems, e.g., audio system, etc.

Finally, patterns where picture is emphasized in accumulation cycle (picture emphasis patterns) are taken as an example.

Figure 18:
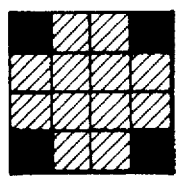
FIG. 18 is a view showing group (1) of picture emphasis pattern.
Figure 18:
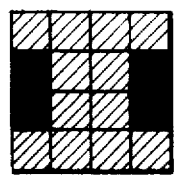
Figure 18:
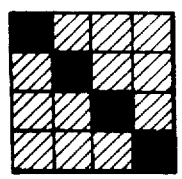
Figure 18:
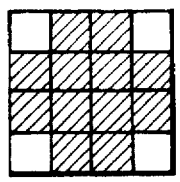
Figure 18:
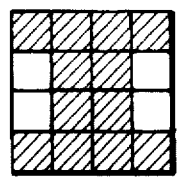
Figure 18:
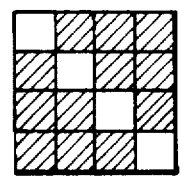
Figure 18:
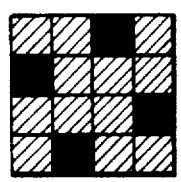
Figure 18:
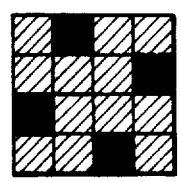
Figure 18:
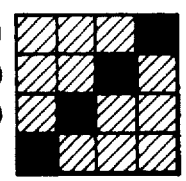
Figure 18:
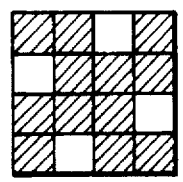
Figure 18:
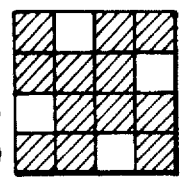
Figure 18:
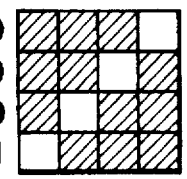
Figure 18:
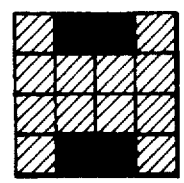
Figure 18:
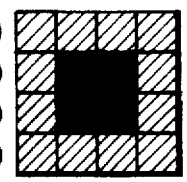
Figure 18:
Figure 18:
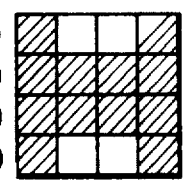
Figure 18:
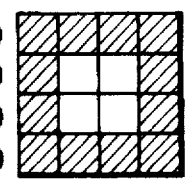
Figure 18:
Figure 19:
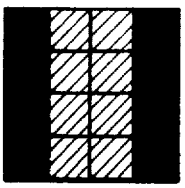
FIG. 19 is a view showing group (2) of picture emphasis pattern.
Figure 19:
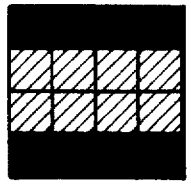
Figure 19:
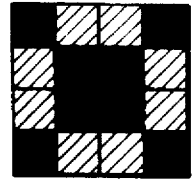
Figure 19:
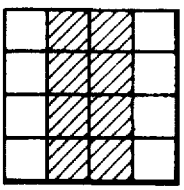
Figure 19:
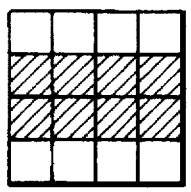
Figure 19:
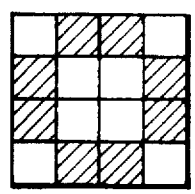
Figure 19:
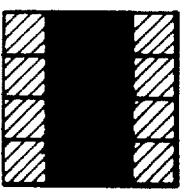
Figure 19:
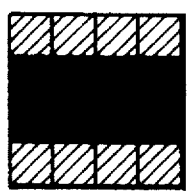
Figure 19:
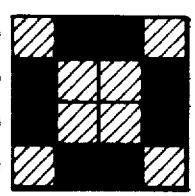
Figure 19:
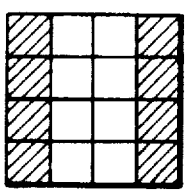
Figure 19:
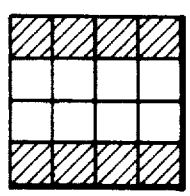
Figure 19:
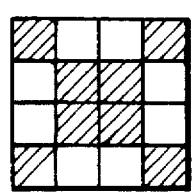
Figure 20:
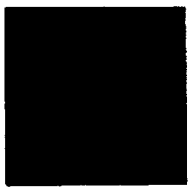
FIG. 20 is a view showing group (3) of picture emphasis pattern.
Figure 20:
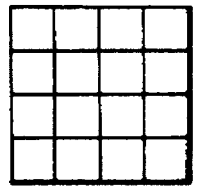
Figure 21:
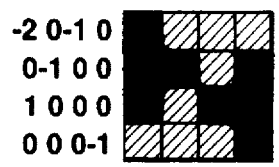
FIG. 21 is a view showing group (4) of picture emphasis pattern.
Figure 21:
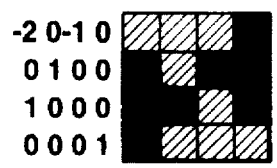
Figure 21:
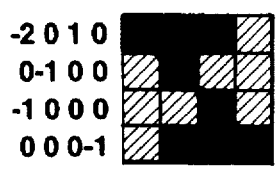
Figure 21:
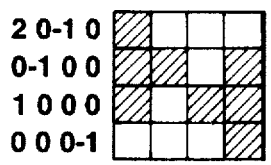
Figure 21:
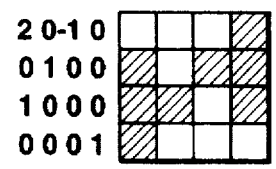
Figure 21:
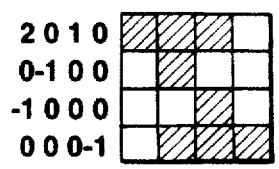
Figure 21:
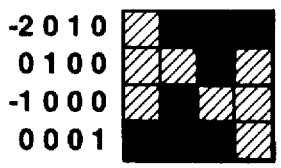
Figure 21:
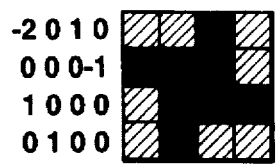
Figure 21:
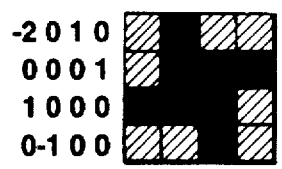
Figure 21:
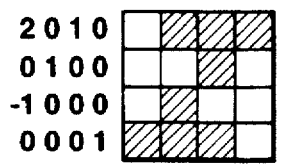
Figure 21:
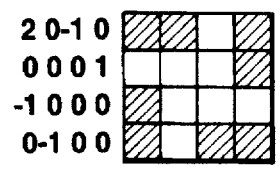
Figure 21:
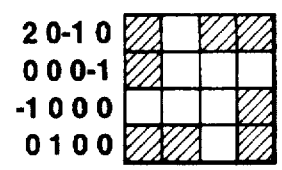
Figure 21:
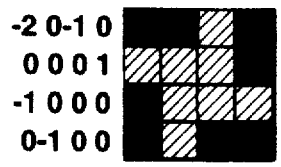
Figure 21:
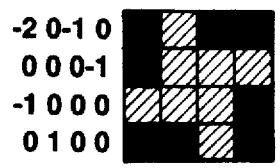
Figure 21:
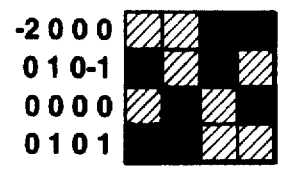
Figure 21:
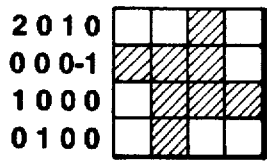
Figure 21:
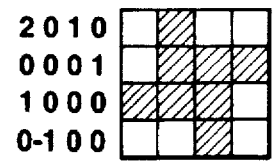
Figure 21:
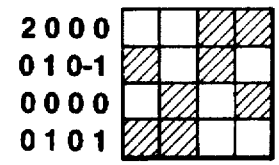
Figure 21:
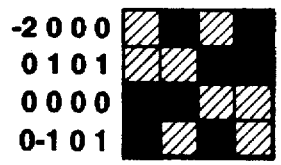
Figure 21:
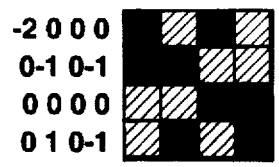
Figure 21:
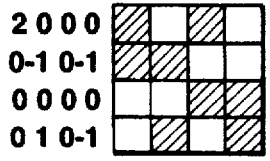
Figure 21:
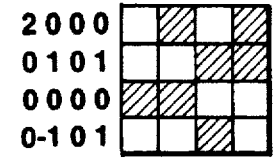

It is considered that variations of patterns in the case where the condition of boundary point of coefficient plane is inputted to inverse transform matrix, so accumulation cycle takes are as indicated by group (1) shown in FIG. 18~group (4) shown in FIG. 21.

In this case, in the groups of (1)~(4), re-quantization step and input coefficient values are assumed to be as follows:

| Re-quantization step | Input coefficient value |
| --- | --- |
| (1) qdc = qac = 1 | DC = −1~+1, ACx = −1~+1 |
| (2) qdc = qac = 2 | DC = −1~+1, ACx = −1~+1 |
| (3) qdc = 4 | DC = −2~+2 |
| (4) qdc = 2, qac = 1 | DC = −2~+2, ACx = −1~+1 |

Moreover, input coefficient value format is assumed to be as follows.

| DC, | AC1, | AC2, | AC3, |
| --- | --- | --- | --- |
| AC4, | AC5, | AC6, | AC7, |
| AC8, | AC9, | AC10, | AC11, |
| AC12, | AC13, | AC14, | AC15 |

The accumulation cycle is the special case where rounding which is integer operation (non-linear processing), and respective coefficients of coefficient plane and space plane samples are satisfactorily related to each other. For example, patterns of groups of (1), (2), (3) shown in FIGS. 18~21 can be enumerated.

What is claimed is:

1. An efficient encoding/decoding apparatus comprising:

orthogonal transform means for orthogonally transforming a digital signal obtained by allowing an analog signal to undergo analog/digital conversion; and inverse orthogonal transform means for inverse-orthogonally transforming the orthogonally transformed digital signal, wherein rounding of endpoints of segments in even number direction or in odd number direction is used in at least one of the orthogonal transform processing and the inverse orthogonal transform processing.

2. An efficient encoding/decoding apparatus as set forth in claim 1, wherein there are provided:

quantizing means for quantizing the digital signal which has undergone the orthogonal transform processing; and inverse quantizing means for inverse-quantizing a digital signal which is not yet caused to undergo the inverse orthogonal transform processing.

3. An efficient encoding/decoding apparatus as set forth in claim 1, wherein the orthogonal transform processing is Discrete Cosine Transform processing, and the inverse orthogonal transform processing is Inverse Discrete Cosine Transform processing.

4. An efficient encoding/decoding apparatus as set forth in claim 1, wherein the orthogonal transform processing is Discrete Wavelet Transform (DWT) processing, and the inverse orthogonal transform processing is Inverse Discrete Wavelet Transform (IDWT) processing.

5. The efficient encoding/decoding apparatus of claim 1, wherein the endpoints of real number segments having lengths of $\Delta$ and centered about $0, \pm\Delta, \pm2\Delta, \pm3\Delta \ldots \pm n\Delta$ are rounded to a nearest one of said even number and odd number.

* * * * *